United States Patent
Ponnuswamy

(10) Patent No.: US 12,034,629 B2
(45) Date of Patent: Jul. 9, 2024

(54) OVERLAY NETWORK MODIFICATION

(71) Applicant: CLOUDBRINK INC., Sunnyvale, CA (US)

(72) Inventor: Subbu Ponnuswamy, Saratoga, CA (US)

(73) Assignee: CLOUDBRINK INC., Sunnyvale, CA (US)

( * ) Notice: Subject to any disclaimer, the term of this patent is extended or adjusted under 35 U.S.C. 154(b) by 0 days.

(21) Appl. No.: 17/901,316

(22) Filed: Sep. 1, 2022

(65) Prior Publication Data
US 2024/0080257 A1 Mar. 7, 2024

(51) Int. Cl.
*H04L 12/28* (2006.01)
*H04L 45/00* (2022.01)

(52) U.S. Cl.
CPC .................... *H04L 45/14* (2013.01)

(58) Field of Classification Search
CPC ... H04L 41/147; H04L 41/0813; H04L 41/12; H04L 41/122; H04L 41/5025; H04L 43/08; H04L 43/0882; H04L 43/0888; H04L 45/02; H04L 45/64; H04L 47/12; H04L 67/1076
See application file for complete search history.

(56) References Cited

U.S. PATENT DOCUMENTS

| | | | |
|---|---|---|---|
| 9,246,817 | B1 | 1/2016 | Daniel |
| 2010/0085892 | A1* | 4/2010 | Kouhi ............... H04L 45/64 370/254 |
| 2016/0380898 | A1 | 12/2016 | Englund et al. |
| 2017/0331753 | A1 | 11/2017 | Li et al. |
| 2018/0123943 | A1* | 5/2018 | Lee ............... H04L 12/4641 |
| 2018/0309636 | A1* | 10/2018 | Strom ............... H04L 47/12 |
| 2020/0396169 | A1 | 12/2020 | Tan et al. |
| 2023/0010512 | A1 | 1/2023 | Sharma et al. |

* cited by examiner

*Primary Examiner* — Mansour Oveissi
(74) *Attorney, Agent, or Firm* — Kumar Maheshwari; Mahesh Law Group PC

(57) ABSTRACT

Techniques for modifying a data transmission overlay network are disclosed. The data transmission overlay network runs overlay network software on physical network devices to transmit data between source devices and destination devices. A system predicts network attributes associated with forwarding nodes of the overlay network in a geographic region. The system modifies the overlay network based on the predicted network attributes. Modifying the overlay network includes modifying existing forwarding nodes to increase or decrease data transmission capacity, adding forwarding nodes, and removing forwarding nodes. The system modifies the overlay network within a particular geographic region for a specified duration of time. The system reverts the overlay network within the geographic region to a pre-modified state once the duration of time elapses.

24 Claims, 10 Drawing Sheets

OVERLAY NETWORK MODIFICATION

TECHNICAL FIELD

The present disclosure relates to modifying an overlay network running on an underlay network, or a physical data transmission network. In particular, the present disclosure relates to adding, removing, and modifying overlay network nodes of an overlay network based on measured and predicted network characteristics.

BACKGROUND

Data transmission networks span the globe to connect users to remote servers running applications accessible to the users. A typical data packet is encapsulated with a destination address at a source device to be sent through a network to a destination device. For example, a source device may attach to a data packet (a) application data, (b) Transmission control protocol (TCP) protocol information, (c) source/destination Internet protocol (IP) address information, and (d) media access control (MAC) address information. Data transmission and processing devices along a transmission path analyze different layers of the packet to determine how to forward the packet to a next hop or how to process the packet.

Initially, the source device sends the packet to the device associated with a layer 2 (L2) address, such as the MAC address, contained in the data packet. The device reads the destination IP address, determines a next hop for the data packet, changes the MAC address to the device associated with the next hop, and forwards the packet to the next device along a transmission path. For example, the source device may send the packet to a router maintained by a local area network. If the data is intended for another device in the same local area network, the router forwards the data to the destination device. If the data is intended for a device outside the local network, the LAN router forwards the data packet to another data forwarding device, such as a router of a regional Internet service provider (ISP).

A typical network infrastructure associated with data transmission over the Internet includes network service provider (NSP) backbone structure (e.g., cable, routers, and access points) at the "top" of a pyramid structure of sub-networks. For example, a network access point (NAP) connects two or more NSP's. An NSP router may connect two or more regional ISP's. A regional ISP may connect two or more sub-networks, such as private local area networks. A router is usually connected between networks to route packets between the networks. Each router stores routing information for its sub-networks and their associated IP addresses. However, the routers do not store information for IP addresses outside their sub-networks. For example, a regional ISP router does not typically store IP address information associated with another ISP router connected to the same NSP router.

When a packet arrives at a router, the router examines the IP address put there by the IP protocol layer on the originating computer. The router checks its routing table. If the network containing the IP address is found, the packet is sent to that network. If the network containing the IP address is not found, then the router sends the packet on a default route, usually to the next router up the hierarchy of networks (e.g., from a regional ISP router to a backbone NSP router). The process is repeated until the data packet reaches either the destination network or the NSP backbone. The routers connected to the NSP backbones hold the largest routing tables. At the NSP routers, a data packet is routed to the correct backbone NSP. From there, the data packet travels down the hierarchy of smaller and smaller networks and sub-networks until it arrives at its destination.

A source device may calculate a round trip time (RTT) for data packets between the source device and the destination device by transmitting a data packet and determining the duration of time until an acknowledging data packet is received. However, since routers in each sub-network do not contain information about routers in other sub-networks, a source device may not obtain granular information about data transmission characteristics, such as delays and jitter, for particular hops on the data transmission path. Even when a particular sub-network monitors data transmission characteristics of devices within the network, it may not be able to monitor data transmission characteristics of devices in other networks along the data transmission path.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1A:
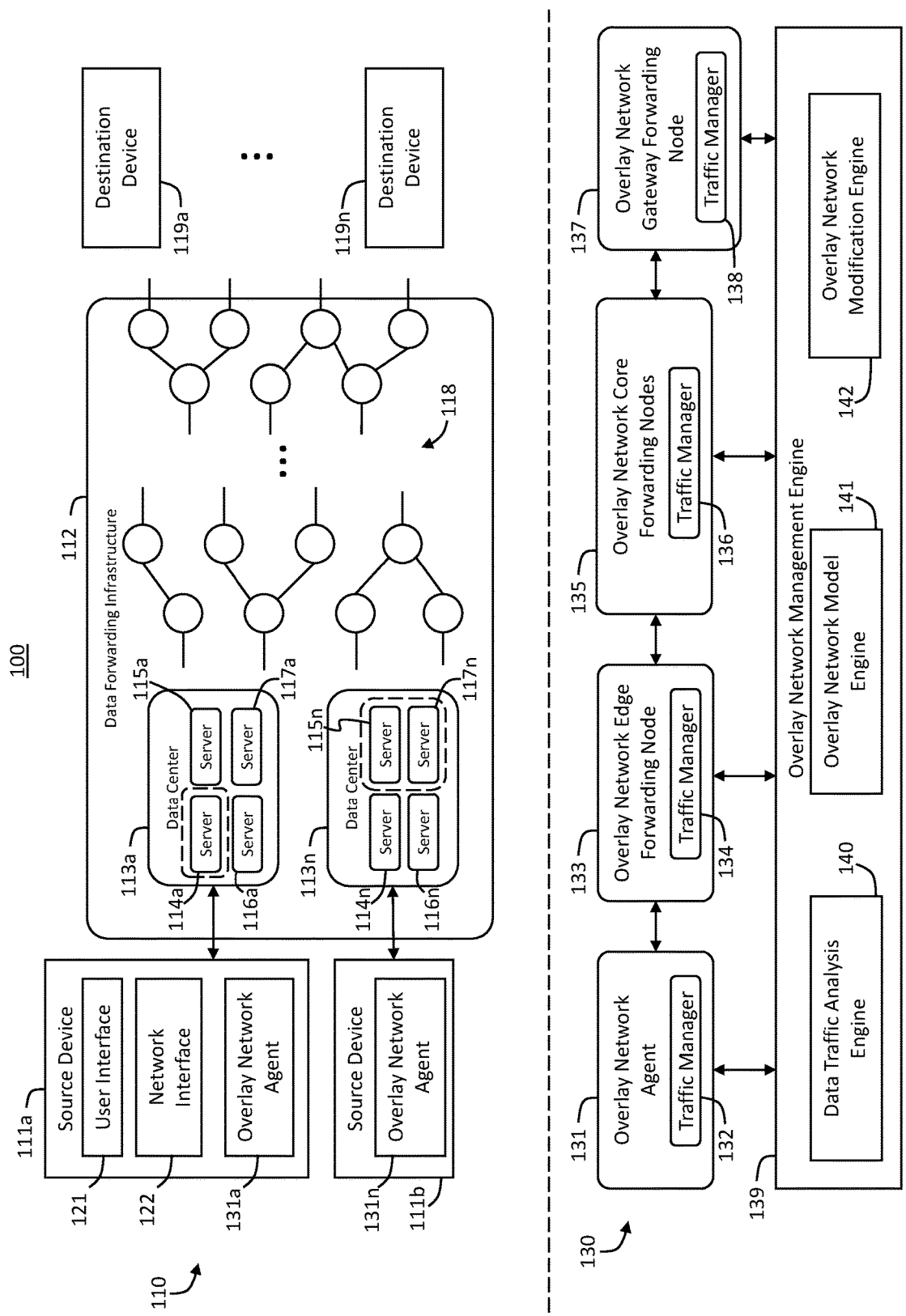
FIGS. 1A and 1B illustrate a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. MODIFYING AN OVERLAY NETWORK
4. TRAINING A MACHINE LEARNING MODEL
5. EXAMPLE EMBODIMENT
6. COMPUTER NETWORKS AND CLOUD NETWORKS
7. MISCELLANEOUS; EXTENSIONS
8. HARDWARE OVERVIEW

1. General Overview

A system includes a data transmission overlay network running on physical network devices of a data transmission network. The data transmission overlay network includes forwarding nodes between a source device and a destination device. For example, a source device may include a personal computer. The destination device may include an application server. The source device may exchange data with the application server to run an application hosted by the application server on the personal computer. The source device transmits data packets through a sequence of forwarding nodes to the destination device.

The forwarding nodes of the data transmission overlay network are implemented as virtual infrastructure technology that allows a virtual instance to be instantiated remotely. Examples of such virtualization technologies include virtual machines (VMs) and containers. An overlay network system may instantiate VMs and containers in underlay network topology devices (such as servers), by interfacing with an application programming interface (API) of a networking services provider.

The forwarding nodes of the data transmission overlay network provide network attribute data to other nodes and agents of the overlay network. The forwarding nodes also modify data transmission routes of data packets transmitted over the overlay network. An overlay network agent running on a source device specifies a route, including a sequence forwarding nodes, for a data packet and includes the routing information in an encapsulating outer header of the data packet. As the data packet is transmitted through the overlay network, forwarding nodes decapsulate the outer header without decapsulating the inner packet. The forwarding nodes analyze network information and determine whether to modify the routing information included in the outer header. For example, a forwarding node can determine that a data transmission time associated with a sequence of forwarding nodes specified by the outer header is longer than a data transmission time associated with a different sequence of forwarding nodes. The forwarding node may modify the sequence of forwarding nodes specified in the outer header to correspond to the shorter transmission time. The forwarding nodes either modify the routing information or leave the routing information unchanged. The forwarding nodes then re-encapsulate the data packet and forward the data packet along to a next hop in the overlay network.

One or more embodiments modify the overlay network based on predicting network data transmission attributes associated with a particular geographic region. For example, a system may predict a level of data traffic through forwarding nodes in a particular geographic region exceeding a threshold value. The system may create one or more new forwarding nodes within the geographic region based on the prediction. In addition, or in the alternative, one or more embodiments increase a data transmission capacity of forwarding nodes already existing in the geographic region.

In addition to data traffic levels, a system may modify the overlay network based on one or more additional data transmission attributes, such as geographic locations of users accessing the data transmission overlay network, per-user traffic of the users accessing the data transmission overlay network, a predetermined minimum number of forwarding nodes required to be maintained operational within the geographical region, a level of data transmission traffic through one or more forwarding nodes in the geographical region, a time associated with the level of data transmission traffic through the one or more forwarding nodes in the geographical region, data processing capacities of the one or more forwarding nodes, a reliability of the one or more forwarding nodes, and a historical level of data transmission traffic through the one or more forwarding nodes in the geographical region.

One or more embodiments modify data transmission routes to and/or from the geographic region based on adding the one or more new forwarding nodes within the geographic region. For example, the system may notify overlay network agents running on source devices that the one or more new forwarding nodes are available as hops along a data transmission route between the source devices and destination devices.

One or more embodiments temporarily modify the overlay network. For example, the system may specify a particular duration of time, such as one day, as a duration for the modification to the overlay network. When the specified duration of time elapses, the system may cause the overlay network to revert to its pre-modified state. For example, if the system modifies the overlay network by adding a new forwarding node within a geographic region, the system may remove the new forwarding node after one day.

One or more embodiments predict the network data transmission attributes by generating a model representing the predicted network data transmission attributes. For example, the system may train a machine learning model based on historical network data transmission attributes to predict one or more future values for the network data transmission attributes. The system may train the machine learning model by iteratively applying sets of historical network data transmission attributes to a machine learning algorithm and adjusting coefficient values and offset values of the algorithm based on the values generated by the machine learning algorithm. The system applies the trained machine learning model to a set of current network data transmission attributes to generate the predicted network data transmission attributes.

One or more embodiments described in this Specification and/or recited in the claims may not be included in this General Overview section.

2. System Architecture

FIG. 1 illustrates a system 100 in accordance with one or more embodiments. As illustrated in FIG. 1, system 100 includes a physical topology 110 and an overlay network 130 overlaid over the physical topology 110. In particular, the physical topology 110 includes infrastructure elements including computers, servers, routers, load balancers, firewall devices, wireless data transmission antennae, and gateways. The physical topology 110 includes transmission lines connecting the computers, servers, routers, load balancers, firewall devices, wireless transmission antennae, and gateways. The overlay network 130 is implemented as software operating on elements of the physical topology 110. In particular, nodes 131, 133, 135, and 137 of the overlay network include virtual machines (VMs) and software packages running on the physical topology 110 to provide particular functionality to devices in the physical topology 110, as discussed below.

For example, a physical router may be connected to two additional physical routers in the physical topology 110. However, in the overlay network 130, an overlay network node operating on the physical router may specify one of the two additional routers as being a part of the overlay network 120. Accordingly, the overlay network software operating in elements of the physical topology 110 may transmit data via other elements in the overlay network 130. The overlay network 130 may refrain from transmitting data via devices in the physical topology 110 that are not running overlay network software. In addition, or in the alternative, a single physical server in the physical topology 110 may be partitioned into two or more virtual servers running overlay network software. The single physical server of the physical topology 110 may appear as two nodes in the overlay network 130.

The physical topology 110 includes source devices 111a-111n, data forwarding infrastructure 112, and destination devices 119a-119n. The source devices 111a-111n communicate with the destination devices 119a-119n to transmit data over the data forwarding infrastructure 112. For example, the destination devices 119a-119n may include servers hosting applications and data accessible by the source devices 111a-111n. The destination devices 119a-119n may be located in data centers and local networks maintained by application and data providers, such as cloud service providers (CSPs). According to one or more embodiments, the destination devices 119a-119n are not part of the overlay network 130. In other words, the destination devices do not run overlay network software. Instead, a data transmission device, such as a gateway device, connecting the destination devices 119a-119n to the data forwarding infrastructure, may run the overlay network software. The gateway device may route data traffic incoming from one or more routers of the data forwarding infrastructure 112 to servers among the destination devices 119a-119n. Alternatively, the gateway device may route data traffic incoming from one or more routers of the data forwarding infrastructure 112 to routers associated with local area networks (LANs). For example, a cloud service provider may maintain its own LAN. The routers hosted by the LANs may direct data traffic incoming from the data forwarding infrastructure 112 to the servers among the destination devices 119a-119n.

The source devices 111a-111n may include any device that generates data or requests to be transmitted through the data forwarding infrastructure 112, which includes the data centers 112a and 112b and the network infrastructure 117. The source devices 111a and 111b may include, for example, a personal computer, a laptop, a mobile handset, a smartphone, a personal digital assistant ("PDA"). According to an example embodiment, the source devices 111a-111n transmit one or both of data and requests for data through the data forwarding infrastructure 112 to the destination devices 119a-119n. For example, a source device 111a may generate a request to run an application hosted by the destination device 119a. The source device 111a may generate a stream of data comprising a request to run the application. The destination device 119a may respond by generating a stream of data comprising request for authorization information or other information from the source device 111a. The source device 111a and the destination device 119a may establish data streams including requests and data as the source device 111a runs the application.

The source devices, including the source device 111a, include a user interface 121 and a network interface 122. The user interface 121 includes hardware and/or software configured to facilitate communications between a user and the source device 111a. The interface 121 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 121 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 121 is specified in one or more other languages, such as Java, C, or C++.

The network interface 122 allows the source device 111a to interact with other devices on the network. The network interface 122 may include, for example, an antenna and/or a physical data transmission port, such as an Ethernet port.

The data forwarding infrastructure 112 includes nodes 118 that receive, transmit, and process data. The nodes may further modify characteristics of data packets associated with the data. Nodes 118 include physical data transmission devices including, for example, servers, routers, and gateways. For example, the data forwarding infrastructure 112 includes servers 114a-114n, 115a-115n, 116a-116n, and 117a-117n maintained in data centers 113a-113n. The data centers 113a-113a may further include routers to receiving incoming data and route data packets to the servers indicated by the data packet header.

One or more embodiments include the overlay network 130. The overlay network 130 is implemented as software operating on the physical topology 110. The overlay network 130 includes overlay network agents 131, overlay network edge forwarding nodes 133, overlay network core forwarding nodes 135, and overlay network gateway forwarding nodes 137. The overlay network 130 may include an overlay network management engine 139.

The overlay network agents 131 are installed in source devices. For example, overlay network agents 131a-131n run in source devices 111a-111n. According to one embodiment, a source device 111a includes a data packet generator. The data packet generator includes applications and circuitry that generate data packets to transmit over a network. The overlay network agent 131 includes a traffic manager 132 to manage data packet traffic from the source device 111a to an overlay network edge forwarding node 133. According to one embodiment, the traffic manager 132 manages data packet traffic from the source device 111a to an overlay network core forwarding node 135 or an overlay network gateway forwarding node 137. As the data packet is transmitted through the overlay network 130 traffic managers 134, 136, and 138 may modify data packet transmission characteristics set by the traffic manager 132 based on detected network characteristics. The overlay network agent 131 includes circuitry and/or software to perform particular data packet management operations. The overlay network agent 131 may include a packet analysis module, a data packet flow analysis module, and a data packet flow management module. The packet analysis module includes circuitry and/or software executed on underlying processing circuitry to analyze packets generated by the packet generator. The packet analysis module identifies packet attributes of the packets. The data packet flow analysis module includes circuitry and/or software executed on underlying processing circuitry to analyze flow characteristics for a particular packet. For example, the data packet flow analysis module may identify a length of a data packet flow. The data packet flow management module includes logic to set quality-of-service (QoS) requirements based on the identified packet attributes. The data packet flow management module may also include logic (implemented as any combination of hardware, such as logic gates of a processing device, and software executing on underlying processing circuitry) to set a packet transmission strategy for a given packet, such as one or more of packet priority, redundancy, and a transmission path, based on characteristics of a packet, such as a length of the data packet flow and the QoS requirements. According to one or more embodiments, a data packet flow management module maps a route for a data packet from the source device to the overlay network gateway node. For example, the data packet flow management module may specify a data transmission route, A B C D E F, for a particular data packet, with "A" being an edge forwarding node in communication with the source device, "F" being a gateway forwarding node connected to a destination device, and "B"-"E" being core forwarding nodes. In contrast, a conventional data packet generating application may specify a destination address for the packet and an address of a next hop for the packet, without specifying the intervening hops between the data packet generating device and the destination device.

According to one or more embodiments, the overlay network agent 131 specifies every hop which includes an overlay network node between a source and a destination. In some cases, one or both of the source and the destination also includes an overlay node. In other cases, one or both of the source and the destination will not include an overlay node. For example, a client may have an overlay network agent installed. According to one example, a source device, having an overlay network agent installed on the source device, may be communicating with a software as a service (SaaS) provider which does not have an overlay network node installed in a destination server. The overlay network agent identifies, based on a network topology, a gateway forwarding node in communication with the SaaS server(s). The overlay network agent specifies a data transmission route, A-B-C-D-E-F, between the client and a gateway forwarding node connected to the SaaS server. On a return transmission path, the gateway forwarding node specifies the data transmission route, F-E-D-C-B-A, to the client. The specified return path may, or may not, be the same as the initial transmission path, according to network conditions. For example, the gateway forwarding node may specify a data transmission route, F-G-H-C-B-A, based on a lower estimated data transmission time than the initial data transmission route. According to another example, a data center hosting SaaS servers may include a gateway forwarding node within the data center. In this example, an overlay network agent may specify the gateway forwarding node as the destination for data packets. In yet another example, a source device generating data packets does not include the overlay network agent. Instead, the overlay network may include a bridge forwarding node (not shown in FIG. 1) between a source device and an edge forwarding node. While not generating data packets, the bridge forwarding node may receive generated data packets and specify data transmission paths over the overlay network for the data packets.

In one embodiment, the overlay network agent 131a includes a network analysis module to analyze network characteristics, such as end-to-end latency in the network. The data packet flow management module may set a packet transmission strategy based on the QoS requirements of a packet and an estimated transmission time to transmit the packets through the network. The data packet flow management module may store the QoS requirements in the data packet by creating a header and attaching the header to the data being transmitted to a destination node. In one or more embodiments, the header is a variable size header including protocol information for a particular data transmission protocol, the QoS requirements for the packet, and historical information identifying the packet's experience in the data transmission network.

Edge forwarding nodes 133 interface between overlay network agents 131 and core forwarding nodes 135. Edge forwarding nodes 133 include virtual machines (VMs) and/or software packages that act as entrance/exit points for data traffic into/from the overlay network. For example, an overlay network agent 131a may be running in a source device 111a that generates data packets for transmission through the data forwarding infrastructure 112. The source device 111a may belong to a local area network (LAN). An edge forwarding node 133 may be a VM running in a server 114a of a data center 113a that connects the LAN to a wide area network (WAN). In other words, by executing the overlay network software, the server 114a is converted from a generic server to an edge forwarding node 133 of the overlay network 130. As an edge forwarding node 133, the server 114a is enabled with functionality to transmit data to and from source devices running overlay network agents and to and from servers functioning as core forwarding nodes 135. According to one embodiment, the WAN is a part of, or connected to, the Internet.

Core forwarding nodes 135 are virtual machines (VMs) and/or software packages implemented in servers of the data forwarding infrastructure 112. In other words, by executing the overlay network software, or by running an overlay network VM, servers are converted from generic servers to core forwarding nodes 135 of the overlay network 130. As core forwarding nodes 135, the servers are enabled with functionality to transmit data to and from edge forwarding nodes 133 and gateway forwarding nodes 137. According to one or more embodiments, core forwarding nodes 135 may include the functionality of edge forwarding nodes 133. For example, an overlay network VM may function as a core forwarding node by receiving data packets from an edge forwarding node and forwarding the data packets to another core forwarding node towards a destination. The overlay network VM may also function as an edge forwarding node 133 by receiving data packets from, and transmitting data packets to, one or more overlay network agents, without any intervening overlay network nodes.

The overlay network 130 further includes an overlay network management engine 139. While FIG. 1A illustrates the overlay network management engine 139 as an element separate from the edge forwarding nodes 133, core forwarding nodes 135, and gateway forwarding nodes 137, in one or more embodiments the overlay network management engine 139 is implemented in a distributed manner among the edge forwarding nodes 133, core forwarding nodes 135, and gateway forwarding nodes 137. According to one embodiment, the overlay network management engine 139 may execute on a computer, such as a server, in communication with the overlay network agents 131, edge forwarding nodes 133, core forwarding nodes 135, and gateway forwarding nodes 137. For example, one edge forwarding node 133 may include management software to receive data from other edge forwarding nodes 133 and to manage spinning up, spinning down, and modification of the edge forwarding nodes 133. In addition, or in the alternative, in one embodiment servers 114a, 115n, and 117n host network overlay software which, when executed, causes the servers 114a, 115n, and 117n to function as edge forwarding nodes 133 of the overlay network 130. Server 114n may host overlay network software which, when executed, causes the server 114n to function as an overlay network management engine 139. According to an alternative embodiment, the servers 114a, 115n, and 117n, which host software causing the servers to function as edge forwarding nodes 133 also host software causing the servers 114a, 115n, and 117n to collectively function as an overlay network management engine 139.

In one or more embodiments, the overlay network management engine 139 refers to hardware and/or software configured to perform operations described herein for analyzing and presenting data. Examples of operations for analyzing a data network to modify an overlay network are described below with reference to FIG. 2.

In an embodiment, the overlay network management engine 139 is implemented on one or more digital devices. The term "digital device" generally refers to any hardware device that includes a processor. A digital device may refer to a physical device executing an application or to a virtual machine. Examples of digital devices include a computer, a tablet, a laptop, a desktop, a netbook, a server, a web server, a network policy server, a proxy server, a generic machine, a function-specific hardware device, a hardware router, a mobile handset, a smartphone, a personal digital assistant ("PDA"), a communication management device, a router, a switch, a controller, an access point, and/or a client device.

The overlay network management engine 139 includes a data traffic analysis engine 140 to analyze data traffic on the overlay network 130. According to one embodiment, the data traffic analysis engine 140 obtains data traffic data from one or more traffic managers 132, 134, 136, and 138 which are running on the overlay network agent 131, overlay network edge forwarding node 133, overlay network core forwarding node 135, and overlay network gateway forwarding node 137, respectively. According to another embodiment, the data traffic analysis engine 140 is implemented as part of one or more of the traffic managers 132, 134, 136, and 138 which are running on the overlay network agent 131, overlay network edge forwarding node 133, overlay network core forwarding node 135, and overlay network gateway forwarding node 137, respectively.

The data traffic analysis engine 140 analyzes the data traffic information received for a particular geographic region. The data traffic analysis engine 140 provides data traffic analysis information to the overlay network modification engine 142 to modify the overlay network based on the received data traffic analysis information. For example, the data traffic analysis engine 140 may measure data traffic received at an edge forwarding node from source devices, or from local area networks, in a particular region. The data traffic analysis engine 140 may compare the measured data traffic to a capacity of the edge forwarding node to process data traffic. Similarly, data traffic analysis engine 140 may compare data traffic to a core forwarding node to a capacity of the core forwarding node to process data traffic.

According to one or more embodiments, the data traffic analysis engine 140 includes an overlay network model engine 141 to generate a model 155 of data traffic through the overlay network 130. The model 155 may include predictions of future data traffic through nodes of the overlay network 130. For example, the data traffic analysis engine 140 may identify one hundred (100) data streams through a set of edge forwarding nodes associate with a geographic region. The 100 data streams may correspond to a low data traffic load for the set of edge forwarding nodes. The overlay network model engine 141 may generate a model 155 based on predicted data traffic in the geographic region to determine whether to modify the overlay network 130 to (a) reduce a number of edge forwarding nodes, (b) increase a number of edge forwarding nodes, (c) maintain the current number of edge forwarding nodes in their current configurations, or (d) maintain the current number of edge forwarding nodes while modifying the processing capacity of one or more edge forwarding nodes.

The overlay network model engine 141 may generate the overlay network model based on a data set including previously-observed seasonal data traffic patterns (such as periodic daily, weekly, or monthly ebbs and flows in data traffic), calculated trends based on present data traffic and recently-measured data traffic, and known future events, such as conventions located in a geographic area. According to one embodiment, the model 155 represents a prediction of a future state of data traffic through the overlay network 130. In addition, or in the alternative, the model may represent a current state of data traffic through the overlay network. According to one or more embodiments, the model 155 represents a prediction of data flows between source devices and edge forwarding nodes associated with a particular geographic region.

According to one embodiment, the overlay network model engine 141 includes a machine learning model engine 143 which generates the network model 155. The machine learning model engine 143 trains the model using a training data set of known network attributes to generate predictions of future network attributes. In addition, or in the alternative, the machine learning model engine 143 may train a model 155 to generate recommendations for modifying the overlay network 130. For example, according to one embodiment the machine learning model engine 143 trains a first model to predict network attributes 154 for a particular period of time, such as three days in the future. The overlay network management engine 139 may generate a graphical user interface (GUI) on a user interface 157 to graphically represent a particular geographic region, edge forwarding nodes processing data traffic from/to the geographic region, and source devices located within the geographic region. Based on comparing predicted network attributes, such as data traffic and RTT between source devices and edge forwarding nodes to threshold values, the overlay network management engine 139 may modify the GUI to represent data flows and/or edge forwarding nodes associated with network attribute values exceeding the threshold values in distinctive visual patterns. For example, the overlay network management engine 139 may highlight a cluster of data flows to an edge forwarding node with a red color. In addition, or in the alternative, the overlay network management engine 139 may increase a visual size of an element representing an edge forwarding node based on an increased level of data traffic being processed by the edge forwarding node. In addition, the machine learning model engine 143 may trains a second model to generate a recommendation for modifying the overlay network. For example, based in part on data indicating a cluster of source devices located in a particular sub-region of a geographic region will generate a high level of traffic contributing to data traffic levels to an edge forwarding node exceeding a threshold value, the second model may recommend adding a particular edge forwarding node at a particular data center that is geographically close to the cluster of source devices. The overlay network management engine 139 may generate a depiction of the recommendation in the GUI with distinctive visual characteristics (such as a distinctive color or dashed lines) to distinguish the depiction as a recommendation based on predicted network attributes.

In some examples, one or more elements of the machine learning model engine 143 may use a machine learning algorithm to perform one or more of (a) predicting future network attribute values, (b) generating a model of the overlay network based on the future attribute values, and (c) generating a recommendation for modifying the overlay network based on measured and/or predicted network attribute values. A machine learning algorithm is an algorithm that can be iterated to learn a target model f that best maps a set of input variables to an output variable, using a set of training data. A machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging, and random forest, boosting, backpropagation, and/or clustering.

In an embodiment, a set of training data includes datasets and associated labels. The datasets are associated with input variables (e.g., measured RTT values associated with source devices, measured delay values for data transmission paths, measured latency values for data transmission paths, etc.) for the target model f. The associated labels are associated with the output variable (e.g., predicted RTT value at a future time, other predicted network attribute values at the future time) of the target model f. The training data may be updated based on, for example, feedback on the accuracy of the current target model f. Updated training data is fed back into the machine learning algorithm, which in turn updates the target model f.

A machine learning algorithm generates a target model f such that the target model f best fits the datasets of training data to the labels of the training data. Additionally, or alternatively, a machine learning algorithm generates a target model f such that when the target model f is applied to the datasets of the training data, a maximum number of results determined by the target model f matches the labels of the training data.

In an embodiment, a first machine learning algorithm can be iterated to learn relationships between measured and obtained data (e.g., network attributes, geographic region data, and time data) and future network attribute values, such as traffic through a particular edge forwarding node at a future time. In an embodiment, a second machine learning algorithm can be iterated to learn relationships between measured and obtained data (e.g., network attributes, geographic region data, and time data) and recommended modifications to an overlay network, such as generating a new edge forwarding node in a particular geographic region.

Figure 1B:
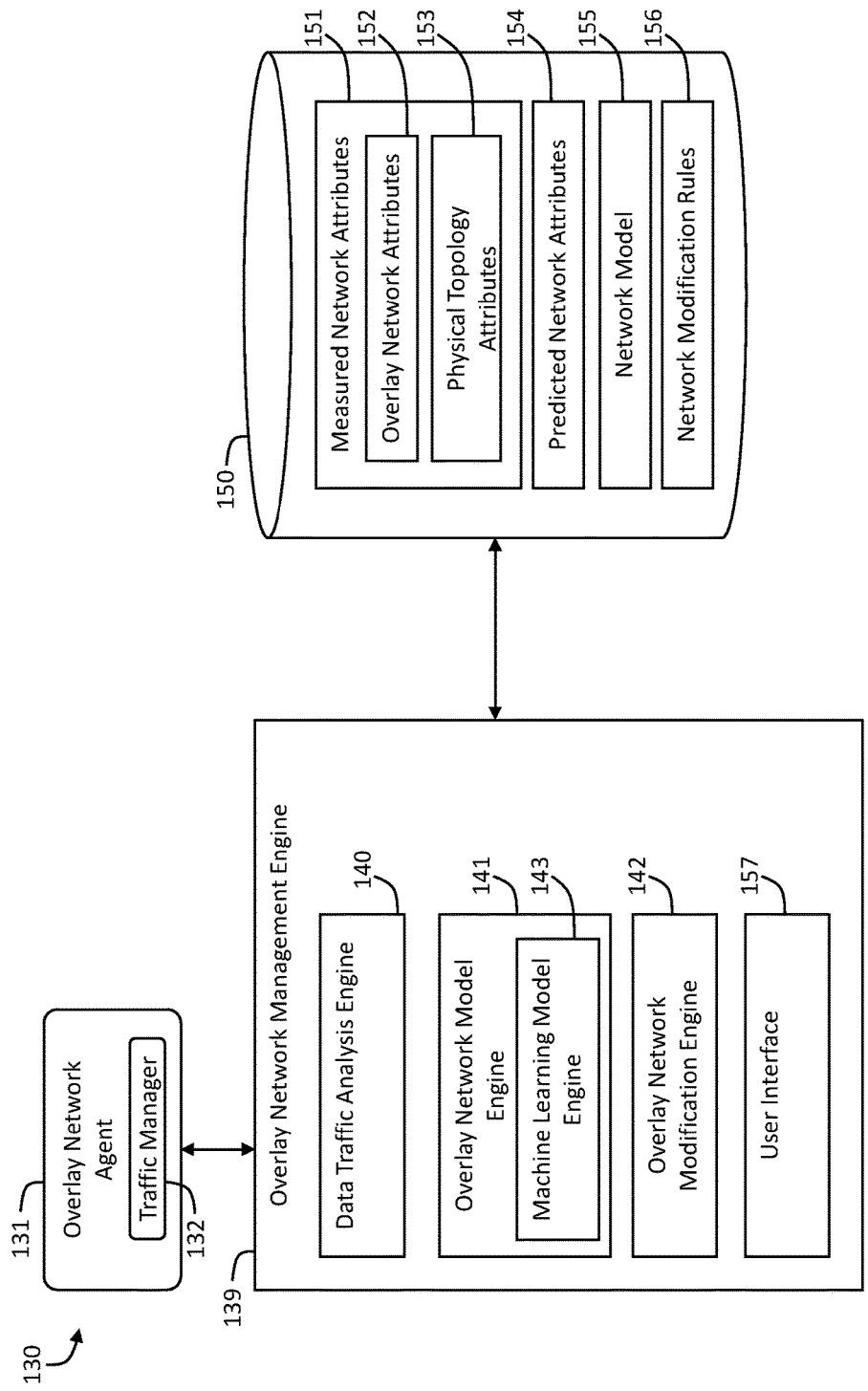

Based on one or both of the data traffic analysis information generated by the data traffic analysis engine 140 and/or the model generated by the overlay network model engine 141, the overlay network modification engine 142 modifies the overlay network 130. The overlay network modification engine 142 may modify the overlay network 130 based on network attributes identified in one or both of the data traffic analysis engine 140 and/or the model 155 generated by the overlay network model engine 141. As illustrated in FIG. 1B, the network attributes may include measured network attributes 151 and predicted network attributes 154. The network attributes may further include overlay network attributes 152 and physical topology attributes 153. Examples of network attributes, which may be measured and/or predicted include: an amount of data traffic to/from an edge forwarding node, an amount of data traffic to/from a core forwarding node, an amount of data traffic to/from a set of two or more edge forwarding nodes associated with data traffic in a particular geographic region, a number of users in a geographic region accessing the overlay network, per-user traffic of the users accessing the overlay network, measured delays in data transmission of data traffic, a number of source devices accessing edge forwarding nodes for a particular geographic region, the types of data (e.g., video, voice, background application data, text-messaging-type data), the number of data flows to/from edge forwarding nodes that correspond to long-lived data flows compared to the number of data flows that correspond to short-lived data flows (e.g., data flows that are short enough to remain in the slow-start stage of a transmission control protocol (TCP) data transmission without advancing to a steady state stage of the TCP), locations of source devices within a geographic region, concentrations of source devices within a geographic region, a round trip time (RTT) for data transmission from an edge forwarding node or edge forwarding group of nodes to users in a geographic region, an RTT from an edge forwarding node or edge forwarding node group to a gateway forwarding node, computing capabilities of edge forwarding nodes, expected changes to data usage at different times, and a data transmission capacity of data transmission elements connected to a group of edge forwarding nodes. In addition to measured and predicted network attributes, defined network attributes may be obtained from a network service provider or from the overlay network provider. Examples of defined network attributes include a minimum number of edge forwarding nodes which may be required to be running in a geographic region (regardless of other attributes), a level of redundancy of edge forwarding nodes required, a cost to add a new edge forwarding node, a cost to modify an existing edge forwarding node, geographic boundaries of a geographic region serviced by an edge forwarding node group, and a historical accuracy of the network model. While some examples of data traffic attributes are provided above, embodiments are not limited to the examples provided above.

According to one or more embodiments, the overlay network modification engine 142 generates a recommendation for modifying the overlay network 130. A human operator may act upon the recommendation to modify the overlay network 130. According to one or more embodiments, the overlay network modification engine 142 may apply one or more rules 156 to determine whether a particular modification requires human approval prior to implementation. For example, the overlay network modification engine 142 may apply one rule that requires human authorization to create a new edge forwarding node associated with a geographic area. The overlay network modification engine 142 may apply another rule that does not require human authorization to shut down the edge forwarding node after a defined period of time based on detecting a reduction in data traffic to the edge forwarding nodes associated with the geographic region.

According to an example embodiment, the overlay network modification engine 142 may add an additional edge forwarding node 133 to a set of edge forwarding nodes associated with a particular geographic region based on determining that the overlay network model 155 predicts data traffic to/from the set of edge forwarding nodes which receive data from source devices within the particular geographic region will exceed an upper threshold level. Adding an edge forwarding node may include running a new instance of overlay network software in one or more servers at a data center that already hosts an existing edge forwarding node of the overlay network 130. Alternatively, or in addition, adding an edge forwarding node may include running a new instance of overlay network software in one or more servers at a data center that is geographically separate from any data center presently hosting any existing edge forwarding node of the overlay network 130.

Conversely, based on determining that the model 155 predicts data traffic to/from a particular set of edge forwarding nodes which receive data from source devices within a particular geographic region will be lower than a lower threshold level, the overlay network modification engine 142 may remove an existing edge forwarding node 133 from the set of edge forwarding nodes associated with the particular geographic region.

According to yet another embodiment, based on determining that the model 155 predicts data traffic to/from a particular set of edge forwarding nodes which receive data from source devices within a particular geographic region will exceed an upper threshold level, the overlay network modification engine 142 may increase a processing capacity of an existing edge forwarding node. For example, an edge forwarding node may be implemented as a virtual machine (VM) running on a server, or a server cluster. The overlay network modification engine 142 may increase the processing capacity of the edge forwarding node by (a) spinning up a second VM on the server cluster, or (b) scaling up a processing capacity (e.g., bandwidth, assigned processing threads, etc.) of the existing VM. Spinning up a second VM or scaling up a processing capacity of an existing VM may be achieved, for example, via one or more application programming interface (API) calls to an API maintained by a cloud services provider (CSP). According to another embodiment, a data center may partition servers to accommodate different clients accessing different partitions of the same server. The partitions may dedicate particular processing capacity to each client and particular data storage for each client. The overlay network modification engine 142 may increase the processing capacity of an existing edge forwarding node by spinning up additional VMs and/or software packages. Based on the computing demands associated with spinning up the additional VMs and/or software packages, a CSP may run the VMs and/or software packages on one or more additional partitions on the same server on which the existing edge forwarding node is already running.

According to one or more embodiments, adding edge forwarding nodes to the overlay network 130 may result in accessing previously inaccessible data paths for data packets to be transmitted between source devices and destination devices. For example, a first edge forwarding node associated with a first geographic region may be communicatively coupled via a data transmission line to a first core forwarding node. A second edge forwarding node associated with a second geographic region may be communicatively coupled via a data transmission line to a second core forwarding node. The first edge forwarding node may not be communicatively coupled via a data transmission line to the second core forwarding node. The overlay network modification engine 142 may add a third edge forwarding node associated with the first geographic region. The third edge forwarding node may be communicatively coupled via a data transmission line to the second core forwarding node. As a result, the overlay network management engine 139 may route some traffic from the first geographic region to the second core forwarding node, which was not previously available to data traffic from the first geographic region.

When the overlay network modification engine 142 modifies the overlay network 130, the overlay network management engine 139 notifies the traffic managers 132, 134, 136, and 138 throughout the overlay network 130 of the change. For example, the overlay network management engine 139 may generate a notification to an overlay network agent 131 located within a geographic region associated with a new edge forwarding node that the new edge forwarding node is available as a data transmission node for routing data from the source device one which the overlay network agent 131 is running. When a source device generates a data packet for transmission to a destination device, the overlay network agent 131 attaches routing information to the data packet. For example, the overlay network agent 131 may analyze route characteristics, such as RTT, data loss rates, and reliability, of available routes and designate a particular edge forwarding node as the next stop for the data packet. In one or more embodiments, the overlay network agent 131 may also designate one or more core forwarding nodes and a gateway forwarding node as routing data for the data packet. When the overlay network modification engine 142 adds a new edge forwarding node for a particular geographic region, the overlay network agents within the geographic region analyze route characteristics associated with the new edge forwarding node to determine whether to designate the new edge forwarding node as a next stop for data packets originating in source devices in which the overlay network agents are running.

The overlay network management engine 139 transmits address data of the new edge forwarding node to the overlay network agents 131 in the geographic area associated with the new edge forwarding node. In some cases, the overlay network management engine 139 may further transmit address data of gateway forwarding nodes 137 accessible via the new edge forwarding node. According to one or more embodiments, the overlay network management engine 139 may transmit network characteristics, such as a measured RTT to transmit data between the new edge forwarding node and one or more gateway forwarding nodes 137, data loss rates associated with the new edge forwarding node, a processing capacity of the new edge forwarding node, and a geographic location of the new edge forwarding node. Notified overlay network agents may determine whether to route packets through the new edge forwarding node based on the network characteristics data provided by the overlay network management engine.

According to one or more embodiments, the overlay network management engine 139 modifies the edge forwarding nodes associated with a particular geographic region for a defined duration of time. The defined duration of time may be defined based on one or more factors, such as: (a) a block of time for which a network device provider leases access to the network device, (b) the predicted period of time during over which the data traffic analysis engine 140 predicts data traffic levels will exceed an upper threshold level, (c) a granularity of the model measuring or predicting data traffic to edge forwarding nodes in a geographic region, (d) a default duration of time assigned by the overlay network provider, (e) a cost associated with purchasing/leasing access to network devices at particular times and for particular durations of time, and (f) a likelihood that a predicted or measured data traffic level for the geographic region is accurate. According to one example, the model predicting the future data traffic levels at edge forwarding nodes associated with a geographic region includes a prediction that the data traffic levels will remain elevated for twelve (12) hours before returning to lower levels. The model may assign the prediction a high level of confidence. The model may further predict that the future data traffic levels at edge forwarding nodes associated with the geographic region may remain elevated for an additional four (4) hours before returning to lower levels. The model may assign the latter prediction a low level of confidence. The overlay network modification engine 142 may apply a set of rules for modifying the overlay network 130 to the model or the data traffic analysis information to determine a defined duration for a modification to the overlay network. For example, the overlay network modification engine 142 may determine that the cost to lease access to the server resources to maintain an additional edge forwarding node is substantially higher for sixteen (16) hours than for twelve (12) hours. Accordingly, the overlay network modification engine 142 may apply a rule that sets the defined duration of time for adding a new edge forwarding node to the overlay network 130 to twelve (12) hours based on the likelihood of the data traffic levels being elevated and the cost to maintain an additional edge forwarding node.

The overlay network management engine 139 may monitor the data traffic levels during the defined duration of time to determine whether to extend a modification to the overlay network 130 or to allow the modification to lapse. For example, if the overlay network management engine 139 adds a new edge forwarding node to handle data traffic associated with a geographic region for a defined duration of twenty-four (24) hours, the overlay network management engine 139 may monitor the data traffic within the geographic region after twenty (20) hours have elapsed to determine whether to extend the availability of the new edge forwarding node for an additional twenty-four (24) hours.

According to one or more embodiments, an overlay network, as illustrated in FIG. 1A, includes overlay network nodes at multiple hops between a source device running an overlay network agent 131 and a gateway forwarding node 137 connected to a destination device, such as an application server, or a private cloud network including the network server. The data traffic analysis engine 140 may obtain network attributes at a level of granularity that corresponds to the number of hops (e.g., nodes or network devices 118 in the physical topology) that include overlay network nodes. For example, in an embodiment in which each hop between an edge forwarding node 133 and a gateway forwarding node is a core forwarding node 135, the overlay network may measure network attributes at any level of granularity, from end-to-end to node-to-node. For example, the data traffic analysis engine 140 may measure (a) a RTT between a source device running an overlay network agent 131 and edge forwarding nodes 133, (b) transmission times between edge forwarding nodes 133 and any downstream core forwarding nodes 135, (c) transmission times between two core forwarding nodes 135, (d) a RTT between a source device and a destination device, (e) transmission times between edge forwarding nodes 133 and gateway forwarding nodes 137, and (f) transmission times between any core forwarding nodes 135 and downstream gateway forwarding nodes 137.

In an embodiment in which one or more intermediate hops do not include overlay network core forwarding nodes 135, the overlay network management engine 139 may not have access to the data transmission attributes of the non-overlay-network devices. However, the system may still calculate overlay network attributes based on the existing overlay network nodes. For example, if a data transmission route includes an edge forwarding node 133, a core forwarding node 135, a first non-overlay server, a second non-overlay server, and a gateway forwarding node 137, the overlay network management engine 139 may calculate RTT values between the edge forwarding node 133 and the gateway forwarding node 137. However, the overlay network management engine 139 may not have access to a transmission time from the first non-overlay server to the second non-overlay server.

In addition to providing increased granularity of network attributes, overlay network nodes further provide increased granularity for data traffic routing. According to one or more embodiments, overlay network node along a route between a source device running an overlay network agent 131 and a gateway forwarding node 137 may alter a route of a data packet based on network attributes detected by the overlay network management engine 139. For example, a conventional process for routing a data packet may include a source device providing a destination address for the data packet in a header of the data packet and an address of a next hop for the data packet. If the next hop (e.g., a router) does not find the destination IP address in its routing table, the router sends the packet on a default route, usually to the next router up the hierarchy of networks (e.g., from a regional ISP router to a backbone NSP router). The process is repeated until the data packet reaches either the destination network or the NSP backbone. In contrast, according to one or more embodiments, instead of routing data packets to default routers, overlay network nodes may route data packets to particular routers along a data transmission path based on detected network characteristics, such as reliability, data loss, delay, and latency. In other words, in a conventional process for routing the data packet, routers lower in the a network hierarchy (such as local area network routers and edge routers) do not have access to network attributes of routers and networks higher up the hierarchy, such as regional ISP routers. Likewise, regional ISP routers do not have access to network attributes of backbone NSP routers. However, the overlay network allows the overlay network management engine 139 to detect network attributes at each hop of the overlay network. In addition, overlay network nodes may route data packets to next overlay network nodes based on detected network attributes rather than based default routing settings. According to an alternative embodiment, one or more regional overlay network management engines 139 may analyze network characteristics and specify hops for data traffic. For example, a data transmission path for a data packet may span three regions. A first overlay network management engine 139 associated with the first region may specify an end-to-end data transmission path for the data packet. A second overlay network management engine 139 associated with a second region may alter the second-region-to-end data transmission path based on measured and estimated network characteristics. A third overlay network management engine 139 associated with a third region may alter the third-region-to-end data transmission path based on measured and estimated network characteristics.

In one or more embodiments, a data repository 150 is any type of storage unit and/or device (e.g., a file system, database, collection of tables, or any other storage mechanism) for storing data. Further, a data repository 150 may include multiple different storage units and/or devices. The multiple different storage units and/or devices may or may not be of the same type or located at the same physical site. Further, a data repository 150 may be implemented or may execute on the same computing system as the overlay network management engine 139. Alternatively, or additionally, a data repository 150 may be implemented or executed on a computing system separate from the overlay network management engine 139. A data repository 150 may be communicatively coupled to the overlay network management engine 139 via a direct connection or via a network.

In one or more embodiments, the system 100 may include more or fewer components than the components illustrated in FIGS. 1A and 1B. The components illustrated in FIGS. 1A and 1B may be local to or remote from each other. The components illustrated in FIGS. 1A and 1B may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 6, titled "Computer Networks and Cloud Networks."

3. Modifying an Overlay Network

Figure 2:
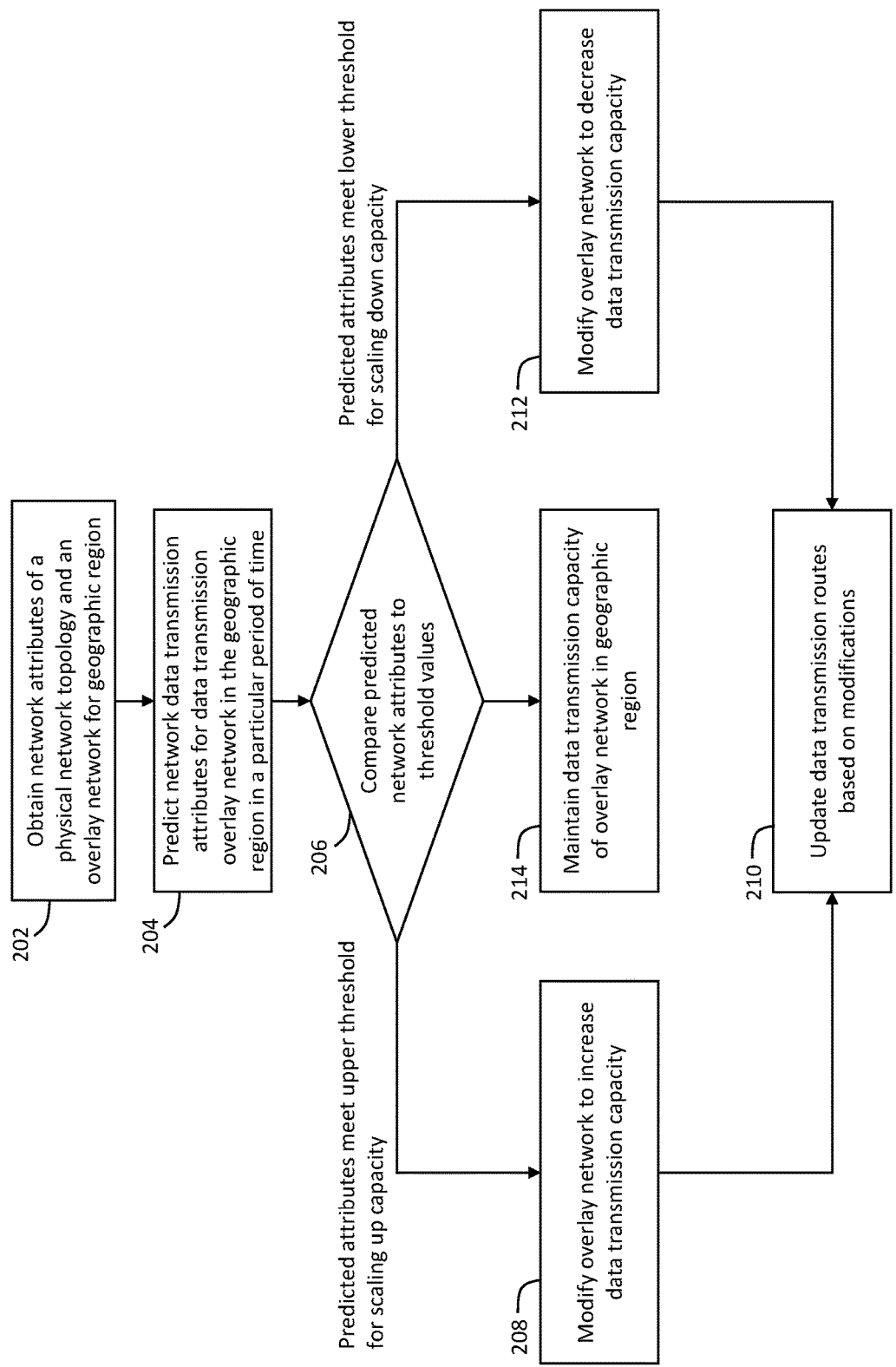
FIG. 2 illustrates an example set of operations for modifying data forwarding nodes in a network in accordance with one or more embodiments.

FIG. 2 illustrate an example set of operations for modifying an overlay network based on network attributes in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

A system obtains network attributes of a physical network topology and an overlay network for a particular geographic region (Operation 202). Network attributes include data transmission attributes through the network, such as RTT for data transmission between network elements. For example, in a system having a topology illustrated in FIG. 1A, in which edge forwarding nodes connect source devices to a data forwarding infrastructure, and in which gateway forwarding nodes connect destination devices to the data forwarding infrastructure, the system may measure the RTT between a source device and a destination device, between a source device and an edge forwarding node, and between an edge forwarding node and a gateway forwarding node.

The network attributes may include attributes of the physical topology and attributes of the overlay network operating on the physical topology. Attributes of the physical topology include data traffic volume and/or bandwidth between network devices, types of data (e.g., video, voice, background application data, text-messaging-type data) that make up the data traffic between the network devices, numbers of network devices that are not part of the overlay network that could be accessed by the overlay network to spin up new overlay network nodes, delays, data loss, and latency between network devices, data transmission capacity of network devices, and data processing capacity of network devices. Attributes of the overlay network may include data traffic volume and/or bandwidth between overlay network nodes and/or between source devices and overlay network nodes, a number of users in a geographic region accessing the overlay network, per-user traffic between source devices and edge forwarding nodes associated with a particular geographic region, types of data that make up the data traffic between the network devices, delay, data loss, and latency between overlay network nodes and/or between source devices and overlay network nodes, and locations of source devices accessing an overlay network within a particular geographic region.

While the above examples include network attributes that may be measured, the system may further obtain from memory network attributes that are specified by a user. For example, a network overlay administrator may set a number of edge forwarding nodes associated with a particular geographic region to a particular minimum value. The network overlay administrator may set a geographic boundary defining geographic regions used to calculate data transmission attributes for the geographic regions. The network overlay administrator may set particular values for data transmission characteristics (such as data processing capacity, processors, and cores) required to run nodes of the overlay network on physical network devices. The system may obtain network attributes such as interconnections between physical devices within a network, a cost to lease or obtain access to network devices for a defined period of time, and processing and storage characteristics (such as a number of processors, a number of cores, and a throughput capacity) of network devices, such as servers.

The system may obtain some network attributes based on a combination of measured data and previously-obtained data. For example, the system may measure an RTT between two overlay network nodes as having a low value within a threshold range. However, the system may access stored historical data indicating that the RTT varies substantially and unpredictably. Accordingly, the system may calculate a low "reliability" network attribute for the overlay network route including the two overlay network nodes.

According to one or more embodiments, the system obtains network attributes based on the combinations of overlay network nodes and non-overlay-network routers along a data transmission path between a source device and a destination device. For example, in a data transmission path that includes multiple non-overlay-network hops, the system may be unable to calculate network attributes specific to the non-overlay network hops. In addition, the system may be unable to specify particular routes through the non-overlay network hops. Instead, the system may measure end-to-end RTT values, data loss values, and latency values. In addition, the system may measure network attributes (such as RTT values, data loss values, and latency values) between a source device running an overlay network agent and an edge forwarding node. In contrast, in a data transmission path that includes overlay network nodes, the system may measure network attributes along any routes including the overlay network nodes. For example, while a non-overlay-network router may designate a default router as a destination for a data packet, an overlay network core forwarding node may include the functionality to designate any other core forwarding node as a next-hop for the data packet. The functionality to designate next-hop core forwarding nodes based on network attributes provides the system with the functionality to measure network characteristics for additional routes between a source device and a destination device beyond routes obtained by routing data packets to default routers.

According to one or more embodiments, the system specifies a geographic region based on (a) locations of source devices, (b) locations of edge forwarding nodes, and (c) geographic distances. For example, in a geographic region having relatively few users/source devices accessing an overlay network, the system may designate a relatively large geographic region to include the source devices and one or more edge forwarding nodes. In contrast, in a region having a relatively large number of users/source devices accessing the overlay network, the system may designate relatively small geographic regions to include the source devices and edge forwarding nodes.

For example, the system may operate under a predefined parameter that, where the locations of edge forwarding nodes permit, each edge forwarding node should not handle more than a first data throughput rate. If the system determines that a particular geographic region includes source devices accessing the overlay network and resulting in three times the first data throughput rate, the system may generate three or more smaller geographic regions from the particular geographic region such that edge forwarding nodes in each of the smaller regions do not exceed the first data throughput rate. As another example, the system may operate under a predefined parameter that, where the locations of edge forwarding nodes permit, each source device should be within a predefined distance of an edge forwarding node. Accordingly, the system may assign geographic boundaries to particular regions associated with edge forwarding nodes based on a distance from the edge forwarding node to source devices.

Based on the measured network attributes and the specified network attributes, the system predicts network attributes associated with the particular geographic region and a particular period of time (Operation 204). According to one embodiment, the system generates a model of the network, including one or both of the physical network devices and the overlay network nodes running on the physical network devices. The model may represent the prediction of the network attributes at a particular point in time.

According to one embodiment, the system generates the prediction model of the network by identifying trends in the measured network attributes. For example, the system may identify data traffic through a particular edge forwarding node increasing at a particular rate. The system may generate the model based on a prediction that the data traffic will continue to increase at the particular rate for a particular duration of time. The system may identify seasonal trends, such as an increase in data traffic through a particular edge forwarding node on a particular day of the week. The system may generate the model based on predicting the data traffic will again increase on the particular day of the week. The system may identify a particular event, such as a meeting or convention, which corresponds to an increase in data traffic through a particular edge forwarding node. The system may generate the model based on predicting the occurrence of the event will again result in the increase in data traffic.

According to one embodiment, the system generates the model predicting system attributes based on a machine learning model. The machine learning model may be trained to predict network attributes associated with a particular geographic region at a particular time based on a data set including attributes associated with geographic regions, including: a number of users/source devices, a number of edge forwarding nodes, data usage attributes of the source devices, and data traffic attributes of the edge forwarding nodes. A process for training a machine learning model to predict network attributes is discussed in further detail in FIG. 3.

According to one or more embodiments, the system selects a period of time for predicting network characteristics based on one or more of: intervals of time in which a network device service provider leases access to network devices, the amount of time required to modify the overlay network, such as by running overlay network software on a server to create a new edge forwarding node, calendar periods of time, such as an hour, a day, a week, or a month, and a specification based on terms in a client contract.

The system compares predicted network attributes to threshold values to determine whether to modify an overlay network (Operation 206). For example, the system may compare RTT rates over the past 12 hours between an edge forwarding node and one or more destination devices with threshold values. As another example, the system may compare per-user/per-source device data rates through an edge forwarding node with threshold values. As another example, the system may compare total data rates through an edge forwarding node with threshold values. As yet another example, the system may compare processor usage rates of an edge forwarding node with threshold values.

For some network attributes, the threshold values may include an upper threshold value and a lower threshold value. For example, the system may compare a data traffic rate through an edge forwarding node to an upper threshold to detect a high rate and to a lower threshold to detect a low rate. The system may compare other network attributes to only one threshold. For example, the system may compare an RTT between a source device and a destination device to a single threshold value to detect delays in the data transmission path.

For example, in a geographic region including two edge forwarding nodes processing traffic from source devices within the geographic region, the system may measure a first RTT between a first edge forwarding node and a gateway forwarding node. The system may measure a second RTT between the second edge forwarding node and the gateway forwarding node. The system may compare the first and second RTT values to a threshold value to detect delays associated with one or both of the first edge forwarding node and the second edge forwarding node. As another example, in a geographic region including three edge forwarding nodes processing traffic from source devices within the geographic region, the system may measure a number of source devices accessing an overlay network. The system may further calculate an average quantity of traffic per user to the edge forwarding nodes processing the traffic within the geographic region. The system may compare the traffic throughput per edge forwarding node to threshold values to determine whether the traffic throughput is relatively high (e.g., above an upper threshold) or relatively low (e.g., below a lower threshold).

Based on determining that a set of predicted attributes exceeds an upper threshold value for the attributes, the system modifies the overlay network to increase data transmission and/or processing capacity (Operation 208). The system may increase data transmission and/or processing capacity by adding a new node to the overlay network or by increasing a capacity of an existing node.

For example, an edge forwarding node comprised of overlay network software running on a first server stored in a first data center may handle traffic within a geographic region. The system may increase the data transmission capacity and processing capacity of the overlay network by creating a new edge forwarding node by running overlay network software on a second server located at a second data center within the geographic region. According to another example, the system may create the new edge forwarding node in the overlay network by running the overlay network software on another server within the first data center.

According to another example, the system may increase the data transmission capacity and processing capacity of the overlay network by obtaining access to one or more additional processing cores, processors, and/or servers. For example, an edge forwarding node may be comprised of a server housed in a rack of a data center. The system may increase the processing capacity and data transmission capacity of the edge forwarding node, without creating a new edge forwarding node, by leasing from a network device provider a second server on the same rack as the first server. The second server may be physically connected to the first server in such a manner as to increase the processing and transmission capacity of the edge forwarding node. According to yet another example, an edge forwarding node may be comprised of a virtual machine running on a server group. The system may increase the processing capacity and data transmission capacity of the edge forwarding node, without creating a new edge forwarding node, by increasing the processing capacity of the virtual machine.

According to one or more embodiments, the system determines a number of new nodes to add to an overlay network, or a processing capacity to increase in an existing node, without adding a new node, based on network attributes. For example, the system may add one new edge forwarding node to an overlay network to handle traffic originating in a geographic region based on determining data traffic within the region is higher than a threshold value by a first amount. The system may add two new edge forwarding nodes to an overlay network to handle traffic originating in the geographic region based on determining data traffic within the region is higher than the threshold value by a second amount greater than the first amount. For example, the system may apply a rule that a new edge forwarding node should be added to the overlay network in a geographic region based on detecting a defined level of traffic within the geographic region. If the detected level of traffic is two times the threshold, the system may create two new edge forwarding nodes. The system may weigh a variety of factors to determine whether to add one or more additional overlay network nodes. For example, the system may consider a cost to add a new overlay network node, a cost to increase a processing capacity of an existing node without adding a new node, a level of traffic handled by existing nodes, data loss rates associated with existing nodes, and predicted improvements to service quality from adding new nodes.

According to one or more embodiments, the system generates a prompt in a user interface to obtain user permission to generate a new overlay network node. The system may apply predefined rules to determine whether to generate a prompt or whether to increase processing capacity without generating a prompt. For example, a predefined rule may specify that the system may increase processing capacity of an existing overlay network node without obtaining user authorization. The rule may further specify that the system must obtain user authorization prior to generating a new overlay network node. Additionally, or in the alternative, the rule may specify that the system may generate a predetermined number of new overlay network nodes within a geographic region without obtaining user authorization. The rule may further specify that the system must obtain user authorization prior to creating new overlay network nodes in excess of the predetermined number of new overlay network nodes.

According to one or more embodiments, adding one or more new edge forwarding nodes includes dividing a geographic region into two or more geographic regions. Source devices access the data forwarding infrastructure (e.g., edge forwarding nodes, core forwarding nodes, and gateway forwarding nodes) of the overlay network via an edge forwarding node. Edge forwarding nodes transmit data to gateway forwarding nodes via core forwarding nodes. Likewise, gateway forwarding nodes transmit data to edge forwarding nodes via core forwarding nodes. The system defines geographic regions based on locations of source devices and locations of edge forwarding nodes. Each source device accessing the overlay network in a particular geographic region accesses the overlay network via an edge forwarding node that is also located in the geographic region. A geographic region includes at least one edge forwarding node and may include any number of source devices. The system may define geographic regions based on (a) physical geography, such as physical distances between source devices and edge forwarding nodes, (b) a number of source devices within the geographic region, and (c) a number of edge forwarding devices within the geographic region. For example, the system may apply a rule for defining geographic regions that specifies each source device should be within a defined distance of an edge forwarding node. The system may apply another rule for defining geographic regions which specifies that a geographic region should be divided into two separate geographic region if dividing the geographic region would result in each new geographic region having a predetermined minimum number of source devices accessing the overlay network and a predetermined minimum level of data traffic to respective edge forwarding nodes of the respective new geographic regions.

According to one or more embodiments, the system may divide an existing region into two or more sub-regions based on detecting data traffic in the sub-regions that exceed threshold levels. The system may assign existing edge forwarding nodes and generate new edge forwarding nodes to the sub-regions based on the data traffic associated with each respective sub-region. According to one example, the system may maintain an existing edge forwarding node at one location within the geographic region. Based on detecting a level of data traffic originating in a particular sub-region of the geographic region, the system may run network overlay software on a server in a data center at another location in the geographic region. The system may divide the geographic region into a first new region in which the original edge forwarding node handles traffic originating in the first new region and a second new region in which the new edge forwarding node handles traffic originating in the second new region. According to one or more alternative embodiments, the system does not divide a geographic region into sub-regions when it creates a new edge forwarding node. Instead, the system may provide overlay network agents running on source devices in the system with network attributes, including data transmission characteristics (e.g., RTT values, latency, data loss, data transmission times), and the overlay network agents may assign an edge forwarding node as a next hop for a data packet based on the data transmission characteristics.

Upon increasing data transmission and/or processing capacity of one or more nodes in the overlay network, the system transmits updated overlay network characteristics to one or more nodes in the overlay network (Operation 210). For example, the system may send to each overlay network in a geographic region address information for an edge forwarding node accessible in the geographic region. Using the address information, the overlay network agents may set the new edge forwarding node as a next hop in a data transmission path for data packets generated by source devices running the overlay network agents. The system may also send to the overlay network agents in the same geographic region as the new edge forwarding node network characteristics associated with the new edge forwarding node. For example, the system may send to the overlay network agents an RTT between the edge forwarding node and one or more gateway forwarding nodes. The system may send to the overlay network agents delay data, reliability data, and latency data for one or more data transmission paths between the new edge forwarding node and one or more destination nodes or devices, such as gateway forwarding nodes or application servers accessed via the gateway forwarding nodes. The network characteristics may include data processing capacity or data transmission capacity of the new edge forwarding node. While the above examples describe notifying overlay network agents upon adding a new edge forwarding node, embodiments include notifying the overlay network agents of increased processing capacity and/or data transmission capacity of an existing edge forwarding node when the system increases the processing capacity and/or data transmission capacity of the existing edge forwarding node without creating a new edge forwarding node.

When the system adds a new edge forwarding node to the overlay network, a new data transmission path downstream of the edge forwarding node may become available. For example, the new edge forwarding node may be communicatively connected via optical cable to a core forwarding node that was not previously communicatively coupled to any edge forwarding nodes in the same geographic region as the new edge forwarding node. Providing the overlay network agents in the geographic region with network characteristics includes notifying the overlay network agents of new candidate route for transmitting data between the source devices running the overlay network agents and destination devices, such as application servers.

In addition to sending updated overlay network information to affected overlay network agents (e.g., overlay network agents running on source devices in a same geographic region as a new or upgraded edge forwarding node), the system also sends updated overlay network information to core forwarding nodes and gateway forwarding nodes. For example, a core forwarding node may be along a data transmission path between a source device and an application server. When the system adds a new edge forwarding node in a geographic region in which the source device is located, the system sends updated overlay network information to the core forwarding node. Upon receiving a data packet from the application server via a gateway forwarding node with a destination address of the source device, the core forwarding node may analyze data transmission route characteristics of data transmission paths between the core forwarding node and any edge forwarding nodes in the geographic region in which the source device is located. The set of edge forwarding nodes in the geographic region includes the new edge forwarding node. If the core forwarding node determines that a data transmission route including the new edge forwarding node is preferable to data transmission routes to other edge forwarding nodes (e.g., has a shorter data transmission time, less data loss, or higher reliability), the core forwarding node may designate the new edge forwarding node as the next stop on the data transmission path toward the source device. According to one or more embodiments, a core forwarding node may change the edge forwarding node designated in a data packet header as the destination edge forwarding node. For example, a gateway forwarding node may have the functionality to designate a particular edge forwarding node as a destination edge forwarding node when transmitting data packets from an application server to a source device. The core forwarding node may receive the data packet designating a first edge forwarding node as a destination edge forwarding node, analyze data transmission route characteristics between the core forwarding node and multiple edge forwarding nodes in a same geographic region as the designated edge forwarding node, and change the designated edge forwarding node from the first edge forwarding node to the new edge forwarding node in the data packet header based on the analysis.

According to another example in which the gateway forwarding node has the functionality to designate an edge forwarding node as a destination edge forwarding node when transmitting data packets from an application server to a source device, the system may transmit information about a new or upgraded edge forwarding node to the gateway forwarding node. When the system adds a new edge forwarding node in a geographic region in which a particular source device is located, which is a target source device to which a gateway forwarding node is transmitting data, the system sends updated overlay network information to the gateway forwarding node. Upon receiving a data packet from the application server with a destination address of the source device, the gateway forwarding node may analyze data transmission route characteristics of data transmission paths between the gateway forwarding node and any edge forwarding nodes in the geographic region in which the source device is located. The set of edge forwarding nodes in the geographic region includes the new edge forwarding node. If the gateway forwarding node determines that a data transmission route including the new edge forwarding node is preferable to data transmission routes to other edge forwarding nodes, the gateway forwarding node may designate the new edge forwarding node as the destination edge forwarding node on the data transmission path toward the source device.

Based on determining that a set of predicted network attributes is less than a lower threshold value for the network attributes, the system modifies the overlay network to decrease data transmission and/or processing capacity of one or more nodes in the overlay network (Operation 212).

For example, two edge forwarding nodes comprised of overlay network software running on two servers stored in two data centers may handle traffic within a geographic region. The system may decrease the data transmission capacity and processing capacity of the overlay network by shutting down one of the edge forwarding nodes. Shutting down an edge forwarding node may include deleting overlay network software on a server or router, transforming the server or router from an overlay network node into a generic server or router. Alternatively, shutting down an edge forwarding node may include sending updated overlay network data to other nodes in the overlay network specifying that the edge forwarding node is no longer available as a destination for data packets transmitted through the overlay network. According to this embodiment, the edge forwarding node may still have the overlay network software loaded onto a server or router, but other nodes in the overlay network may be prevented from transmitting data via the edge forwarding node.

According to another example, the system may decrease the data transmission capacity and processing capacity of the overlay network by relinquishing access to one or more processing cores, processors, and/or servers. For example, an edge forwarding node may be comprised of a server housed in a rack of a data center. The system may decrease the processing capacity and data transmission capacity of the edge forwarding node, without shutting down the edge forwarding node, by reducing the processing resources (e.g., servers, processors, etc.) leased from a network device provider. According to yet another example, an edge forwarding node may be comprised of a virtual machine running on a server group. The system may decrease the processing capacity and data transmission capacity of the edge forwarding node, without shutting down the edge forwarding node, by decreasing the processing capacity of the virtual machine.

According to one or more embodiments, the system determines (a) whether to decrease processing capacity of an existing node or shut down an existing node, and (b) a number of overlay network nodes to shut down based on network attributes. For example, the system may remove one existing edge forwarding node from an overlay network in a geographic region based on determining data traffic within the region is lower than a threshold value by a first amount. The system may remove two existing edge forwarding nodes from the overlay network in the geographic region based on determining data traffic within the region is lower than the threshold value by a second amount greater than the first amount. The system may weigh a variety of factors to determine whether to remove one or more overlay network nodes from the overlay network. For example, the system may consider a cost savings of removing an existing overlay network node from the overlay network, a cost to restart the overlay network node at a later time, a likelihood that the system will be required to restart the overlay network node at a later time based on predicted network attributes, cost savings of reducing a processing capacity of an existing node without removing the existing node from the overlay network, a level of traffic handled by existing nodes, data loss rates associated with existing nodes, and predicted changes to service quality from removing an existing node.

According to one or more embodiments, the system generates a prompt in a user interface to obtain user permission to remove an existing overlay network node from the overlay network. The system may apply predefined rules to determine whether to generate a prompt or whether to reduce processing capacity without generating a prompt. For example, a predefined rule may specify that the system may decrease processing capacity of an existing overlay network node without obtaining user authorization. The rule may further specify that the system must obtain user authorization prior to removing any existing node from the overlay network. Additionally, or in the alternative, the rule may specify that the system may remove a predetermined number of existing overlay network nodes within a geographic region from the overlay network without obtaining user authorization. The rule may further specify that the system must obtain user authorization prior to removing a number of overlay network nodes in excess of the predetermined number of overlay network nodes.

According to one or more embodiments, removing one or more existing edge forwarding nodes includes merging two or more geographic regions into one geographic region. The system may merge two or more geographic regions into one geographic region based on detecting data traffic in the sub-regions that is lower than threshold levels. The system may assign existing edge forwarding nodes to the combined geographic region. The system may shut down at least one edge forwarding node in the combined geographic region based on the data traffic associated with the edge forwarding node.

Upon decreasing data transmission and/or processing capacity of one or more nodes in the overlay network, the system transmits updated overlay network characteristics to one or more nodes in the overlay network (Operation 210). For example, the system may send to each overlay network in a geographic region an updated table of available edge forwarding nodes in the geographic region. The updated table may omit an edge forwarding node removed from the overlay network by the system. In an embodiment in which the system reduces processing and/or data transmission capacity of an existing edge forwarding node without removing the edge forwarding node from the overlay network, the system may send to the overlay network agents in the same geographic region as the edge forwarding node network characteristics associated with the modified edge forwarding node. For example, the system may send to the overlay network agents an updated RTT between the edge forwarding node and one or more gateway forwarding nodes. The system may send to the overlay network agents updated delay data, reliability data, and latency data for one or more data transmission paths between the edge forwarding node and one or more destination nodes or devices, such as gateway forwarding nodes or application servers accessed via the gateway forwarding nodes. The network characteristics may include the updated data processing capacity or data transmission capacity of the modified edge forwarding node.

When the system removes an existing edge forwarding node from the overlay network, a previously-available data transmission path downstream of the edge forwarding node may become unavailable. For example, the edge forwarding node may be communicatively connected via optical cable to a core forwarding node that was not communicatively coupled to any other edge forwarding nodes in the same geographic region as the removed edge forwarding node.

In addition to sending updated overlay network information to affected overlay network agents (e.g., overlay network agents running on source devices in a same geographic region as the removed or modified edge forwarding node), the system also sends updated overlay network information to core forwarding nodes and gateway forwarding nodes. For example, a core forwarding node may be along a data transmission path between a source device and an application server. When the system removes an edge forwarding node in a geographic region in which the source device is located from the overlay network, the system sends updated overlay network information (such as an updated router table omitting the removed edge forwarding node) to the core forwarding node. Upon receiving a data packet from the application server via a gateway forwarding node with a destination address of the source device, the core forwarding node may analyze data transmission route characteristics of data transmission paths between the core forwarding node and any edge forwarding nodes in the geographic region in which the source device is located. The set of edge forwarding nodes in the geographic region omits the removed edge forwarding node.

According to another example in which the gateway forwarding node has the functionality to designate an edge forwarding node as a destination edge forwarding node when transmitting data packets from an application server to a source device, the system may transmit information about a removed or modified edge forwarding node to the gateway forwarding node. When the system removes an edge forwarding node in a geographic region in which a particular source device is located from the overlay network, which is a target source device to which a gateway forwarding node is transmitting data, the system sends updated overlay network information to the gateway forwarding node. Upon receiving a data packet from the application server with a destination address of the source device, the gateway forwarding node may analyze data transmission route characteristics of data transmission paths between the gateway forwarding node and any edge forwarding nodes in the geographic region in which the source device is located. The set of edge forwarding nodes in the geographic region omits the removed edge forwarding node.

If the system determines that the predicted network attributes fall within threshold values, the system may maintain the overlay network in its current configuration (Operation 212). The system may repeat the analysis of the overlay network at periodic intervals to determine whether to add, remove, or modify edge forwarding nodes from the overlay network. The system may also repeat the analysis of the overlay network at periodic intervals to determine whether to add, remove, or modify core forwarding nodes and gateway forwarding nodes from the overlay network.

While an example is provided above in which a system compares network attributes with threshold values to determine whether to modify an overlay network, one or more alternative embodiments include training a machine learning model to recommend modifications to the overlay network. The machine learning model may include a neural network. The neural network may be trained by a data set including network attributes, such as those discussed above, at different periods of time. The data set may also include specific threshold values that have been historically used to determine whether to modify the overlay network. In an alternative embodiment, the data set omits the specific threshold values. Instead, the data set may include the network attributes, physical topology information, and overlay network information. The neural network may train a machine learning model to identify which overlay network configurations should be utilized for particular network attributes. The system may compare the recommended overlay network configurations to existing overlay network configurations to identify recommended changes to the existing overlay network. For example, the neural network may learn during training that a system has maintained a particular cost/data traffic relationship when adding or removing edge forwarding nodes to the overlay network. Given a set of current or predicted network attributes, the machine learning model may identify that an edge forwarding node should be added to the overlay network to maintain the learned cost/data traffic relationship.

While an example is provided above in which the system determines whether to modify an overlay network based on a predicted state of the overlay network, one or more embodiments include determining whether to modify the overlay network based on measured and obtained network attributes, without predicting future values for the network attributes. For example, the system may generate a model of the current state of the overlay network without generating a model of a predicted future state of the overlay network. The system may determine whether to modify the overlay network based on the model representing the current state of the overlay network.

According to one or more embodiments, the system modifies the overlay network for a defined period of time. At the conclusion of the defined period of time, the system reverts the overlay network back into an unmodified state. For example, the system may modify the overlay network to include another edge forwarding node to handle data traffic originating in a geographic area. The system may set a duration for the modification to a default period of time of one day. At the conclusion of one day, the system may remove the newly-generated edge forwarding node from the overlay network, returning the overlay network to its pre-modification state. According to one embodiment, the system returns the overlay network to its pre-modification state without obtaining intervening user authorization. In addition, or in the alternative, the system may return the overlay network to its pre-modification state without performing any intervening determination of whether network attributes of the overlay network exceed thresholds for modifying the overlay network. According to an alternative embodiment, prior to returning the overlay network to its pre-modification state, the system may analyze network attributes to determine whether to maintain the overlay network in its modified state or revert to its pre-modification state. For example, the system may modify the overlay network to include an edge forwarding node in a geographic region. The modification may be for a duration of one day. At the end of the day, the system may analyze network attributes to determine whether data traffic rates to edge forwarding nodes in the geographic region exceed a threshold value. If the system determines that the data traffic rates do not exceed the threshold value, the system may remove the newly-created edge forwarding node from the overlay network. If the system determines that the data traffic rates exceed the threshold value, the system may keep the new edge forwarding node operational in the overlay network. According to yet another embodiment, the system may generate a prompt in a user interface at the end of the specified period of time. A user may respond to the prompt to either authorize keeping the overlay network in its modified state or reverting the overlay network to its pre-modification state. For example, if the system modifies the overlay network by adding an edge forwarding node, the user may respond to the prompt at the end of the specified period of time to authorize the system to remove the added edge forwarding node from the overlay network.

4. Training a Machine Learning Model

Figure 3:
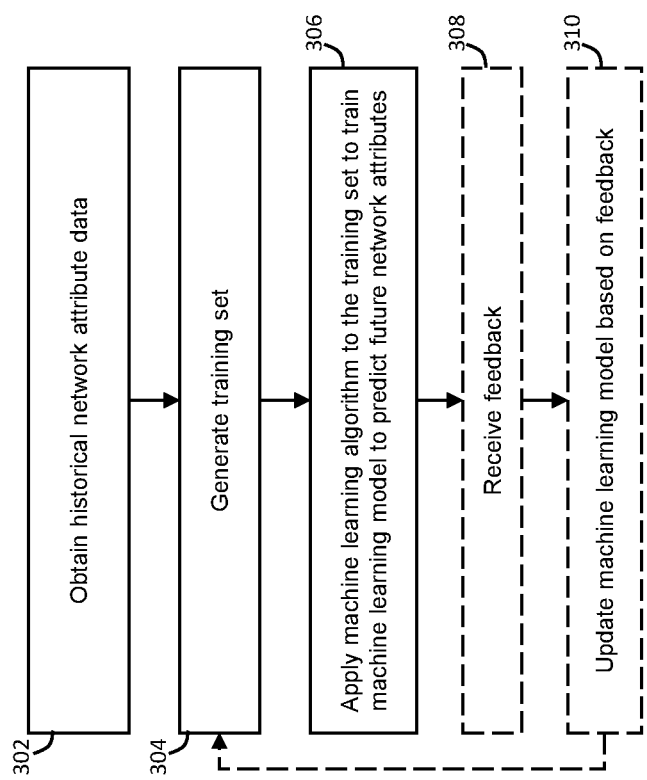
FIG. 3 illustrates an example set of operations for training a machine learning model to predict overlay network attributes according to one or more embodiments.

FIG. 3 illustrates an example set of operations for training a machine learning model to generate supplementary information associated with a runbook operation, in accordance with one or more embodiments. A system obtains historical network data of a physical network and an overlay network running on the physical network to manage data traffic over the physical network (Operation 302). As discussed above, network attributes include measured attributes, obtained attributes (such as user-specified attributes), geographic information about locations of physical network devices and overlay network nodes running on the physical network devices. Examples of network attributes include data traffic through an edge forwarding node over a particular period of time, a geographic region associated with the edge forwarding node, a number of edge forwarding nodes in the geographic region, and a number of devices in the geographic region sending and/or receiving traffic through the edge forwarding node.

Once the various data (or subsets thereof) are identified in Operation 302, the system generates a set of training data (operation 304). Training data may include values and vectors associated with sets of historical network attributes and values and/or vectors associated with subsequent network attributes. For example, the system may encode network attribute data associated with a geographic region at ten consecutive periods of time as vector values. The system may pair the set of ten vector values with a set of values and/or a vector representing network attribute data associated with the geographic region at a future period of time. The training data includes multiple sets of vectors (e.g., the training data may include 100,000 sets of ten vectors representing consecutively measured network attribute values in a geographic region).

The system applies a machine learning algorithm to the training data set (Operation 306). The machine learning algorithm analyzes the training data set to identify data and patterns that indicate relationships between the input data (e.g., sets of network attribute values) and subsequently-measured network attribute values. Types of machine learning models include, but are not limited to, linear regression, logistic regression, linear discriminant analysis, classification and regression trees, naïve Bayes, k-nearest neighbors, learning vector quantization, support vector machine, bagging, and random forest, boosting, backpropagation, and/or clustering.

In examples of supervising machine learning algorithms, the system may obtain feedback on the whether a set of predicted network attribute values should be associated with a particular set of multiple sets of network attribute values (Operation 308). For example, the machine learning model may receive as input data vectors representing an average data flow through an edge forwarding node on ten consecutive days. The machine learning model may generate an output value for a prediction of the data traffic through the edge forwarding node on day 11 that is outside a specified threshold (e.g., a user may define a threshold to identify spikes in predicted values). A user may provide feedback to reject the prediction based on determining that the prediction is based on a non-representative set of input data resulting in an unrealistic output value prediction. Alternatively, the feedback may affirm a particular prediction of one or more network attribute values for a future period of time. Based on the feedback, the machine learning training set may be updated, thereby improving its analytical accuracy (Operation 310). Once updated, the system may further train the machine learning model by optionally applying the model to additional training data sets.

5. Example Embodiment

Figure 4A:
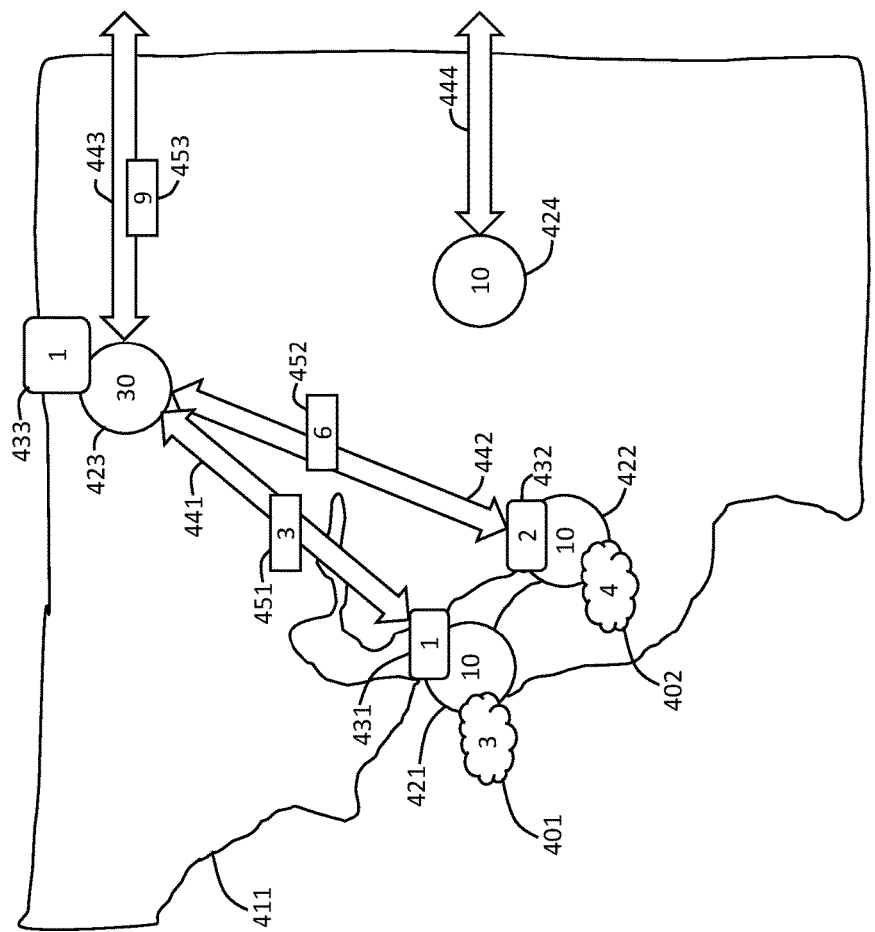
FIGS. 4A-4E illustrate an example embodiment for modifying an overlay network in accordance with one or more embodiments.

FIGS. 4A-4E illustrate an example embodiment of modifying a network topology. FIG. 4A illustrate a geographic region 411. A system identifies source devices that are part of local area networks (LANs) accessing an overlay network. The system identifies three (3) LANs 401 accessing the overlay network via an edge forwarding node 431 and four (4) LANs 402 accessing the overlay network via the edge forwarding node 432. The edge forwarding node 431 comprises one server in a data center 421. The edge forwarding node 432 comprises two servers in the data center 422. The system may identify a physical network topology within the geographic region 411. The physical network topology includes data centers 421 and 422, an access point 423, and an access point 424. The system identifies transmission lines 441 and 442 communicatively connecting the data centers 421 and 422 to the access point 423. The data center 421 has an available server capacity of ten (10) servers to connect LANs to additional network access points. The data center 422 also has an available server capacity of ten (10) servers. Access point 423 has a router capacity of thirty (30) routers to route data traffic to additional access points. The overlay network runs one core forwarding node 433 at the access point 423. Access point 424 has a router capacity of ten (10) routers to route data traffic to additional access points. The overlay network does not run any core forwarding nodes from the access point 424. Access point 423 is connected via optical fiber transmission line 443 to one or more additional access points. Access point 424 is connected via optical fiber transmission line 435 to one or more additional access points. In the example embodiments of FIGS. 4A-4E, access points are groups of routers for routing data between networks.

The system measures network attributes to generate a model of the overlay network in the geographic region 411. For example, the system may measure or detect an amount of traffic between the edge node 431 and the core forwarding node 433, a type of data within the traffic, delays in the traffic, latency in the traffic, and destination addresses of the traffic to generate a weight score associated with overlay network nodes. For example, based on the traffic between the edge forwarding node 431 and the core forwarding node 433, the system may assign a weight score 451 of 3 to the edge forwarding node 431. Based on the traffic between the edge forwarding node 432 and the core forwarding node 433, the system may assign a weight score 452 of 6 to the edge forwarding node 431. For example, the edge forwarding node 432 may generate a larger quantity of traffic, a higher percentage of high-priority traffic, such as video data, or may be experiencing delays during transmission. The system may assign a weight score 453 of 9 to the core forwarding node 433 based on the combined weight scores of the edge forwarding nodes feeding into the core forwarding node 433.

Figure 4B:
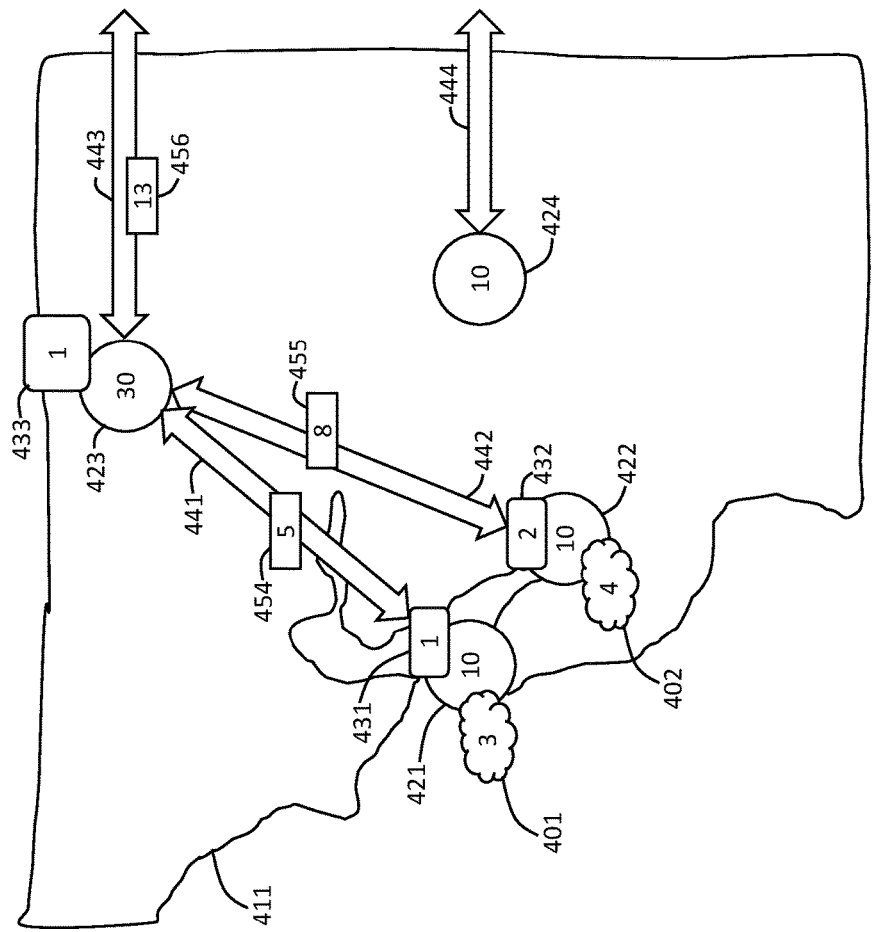

Based on the measured and obtained network attribute values, the system generates a prediction of a future state of the overlay network. As illustrated in FIG. 4B the system predicts a weight score 454 of "5" associated with the edge forwarding node 431 and a weight score 455 of "8" associated with the edge forwarding node 432. The system assigns a weight score 456 of "13" to the core forwarding node 433 based on the combined weight scores 454 and 455 of the edge forwarding nodes 431 and 432.

The system may compare weight scores for nodes in the overlay network to threshold values to determine whether to modify the overlay network. For example, the system may assign a threshold value of "8" to the edge nodes 431 and 432. The threshold value may be based on network attributes, such as a cost to create a new overlay network node, a cost to increase processing and/or data transmission capability of existing overlay network nodes, and existing processing capacity and/or data transmission capacity of existing overlay network nodes. If the system determines that the weight score associated with a node exceeds the threshold, the system may modify the overlay network to either increase a data processing/transmission capacity of an existing node or create a new node. In the example illustrated in FIG. 4B, the predicted weight values 454 and 455 for the edge forwarding nodes 431 and 432 do not exceed the threshold value ("8").

The system may generate a predicted weight score 456 of "13" for the core forwarding node. The system may determine a threshold score for the core forwarding node. Similar to the forwarding edge nodes, the threshold score for the core forwarding node may be based on network attributes associated with the core forwarding node, such as a cost to create a new overlay network node, a cost to increase processing and/or data transmission capability of existing overlay network nodes, and existing processing capacity and/or data transmission capacity of existing overlay network nodes. For example, a core forwarding node running on a router capable of processing 10 gigabytes (GB) per second may have a higher threshold weight than a core forwarding node running on a router capable of processing 1 GB/sec.

The system determines that the core forwarding node 433 has a threshold weight of "10." Since the predicted weight assigned to the core forwarding node is 13, the system determines that the overlay network should be modified to increase processing capacity of the core forwarding nodes within the geographic region 411.

Figure 4C:
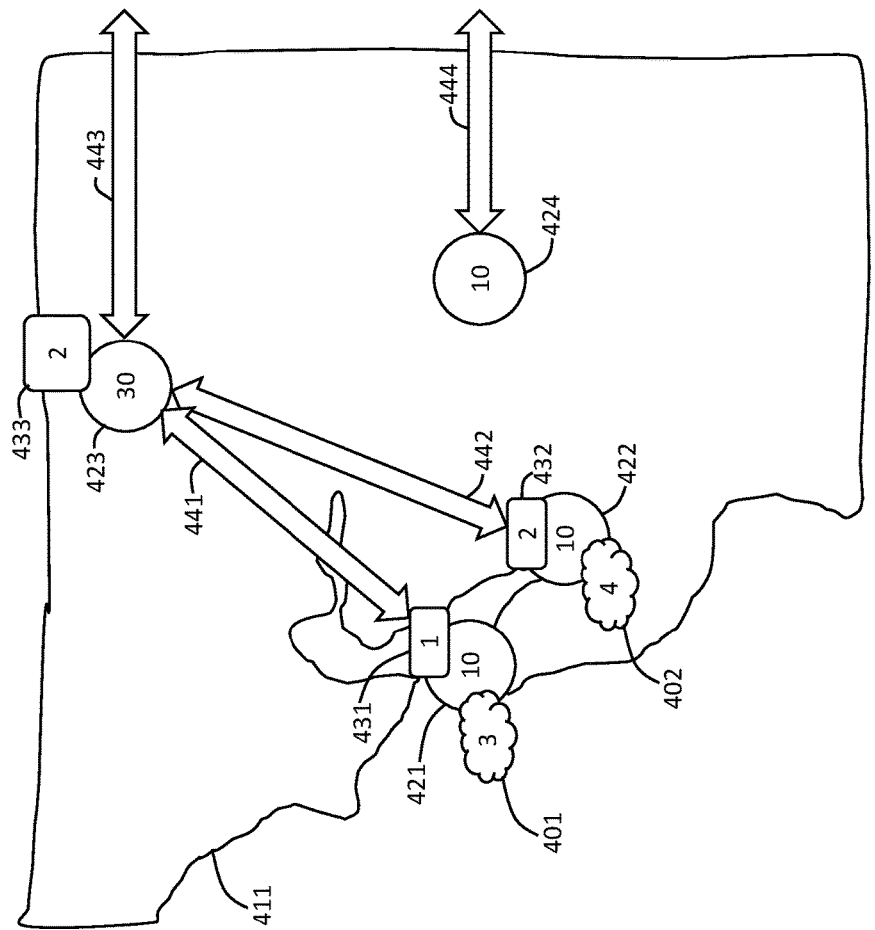

FIG. 4C illustrates a first candidate modification to the overlay network. As illustrated in FIG. 4C, the system increases a data transmission capacity of the core forwarding node 433 by leasing an additional router from a network device provider. The additional router provides additional processing capacity for the core forwarding node. For example, the additional router may increase the processing capacity from "10" to "20."

Figure 4D:
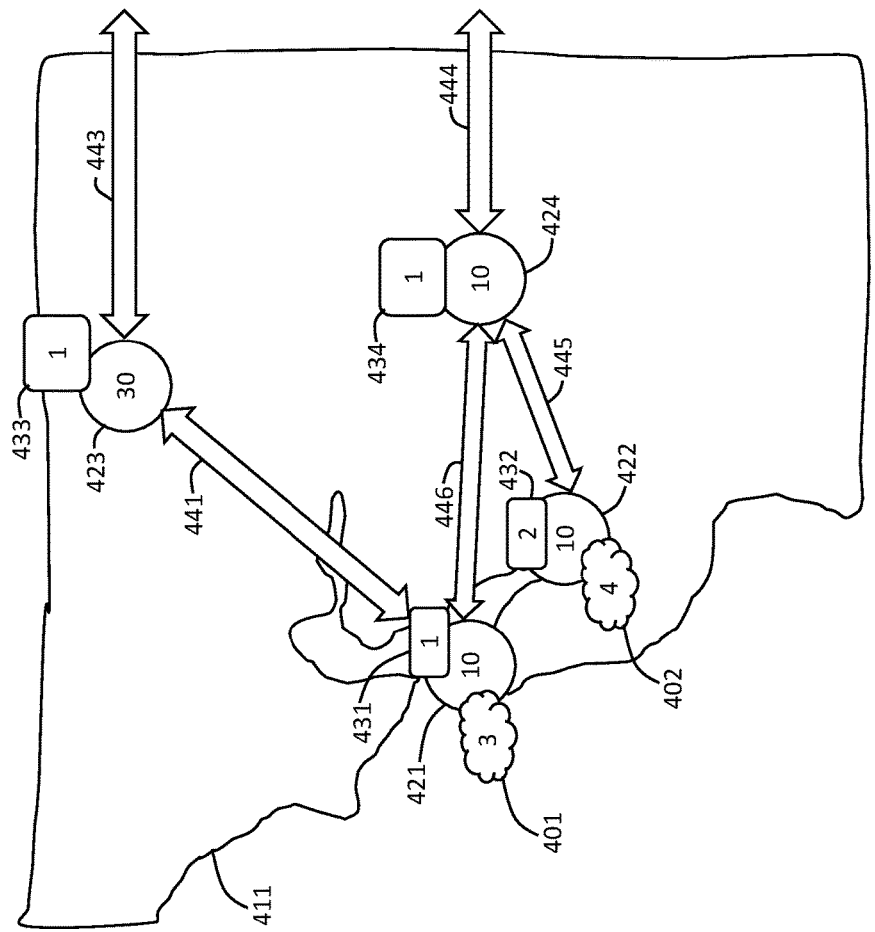

FIG. 4D illustrates a second candidate modification to the overlay network. As illustrated in FIG. 4D, the system creates a new core forwarding node 434 by running overlay network software on a router of the access point 424. The system notifies overlay network agents running on source devices in the LANs 401 and 402 that the core forwarding node 434 is available for routing data packets. The overlay network agents may transmit traffic over data transmission lines 446 and 445 between the data centers 421 and 422 and the access point 424. The core forwarding node 434 may have a higher threshold weight value than the core forwarding node 433 based on running on a router having a higher data transmission capacity. For example, the system may assign a threshold weight value of "12" to the core forwarding node 434.

Figure 4E:
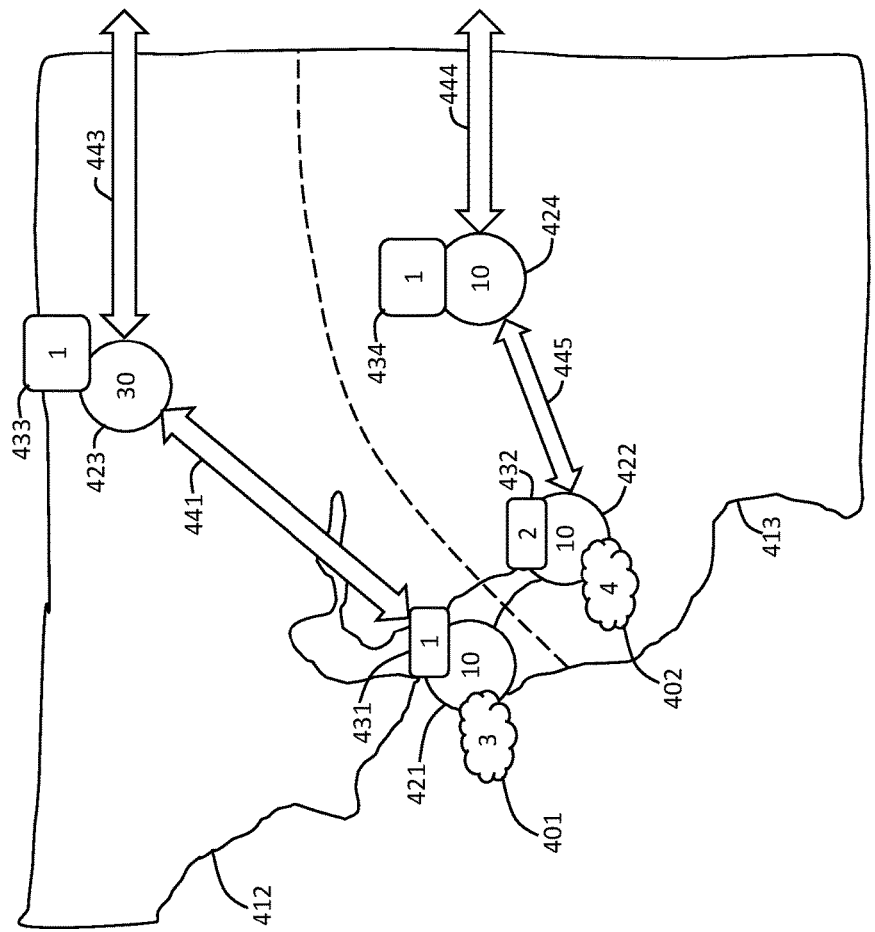

FIG. 4E illustrates a third candidate modification to the overlay network. Similar to FIG. 4D, the system creates a new core forwarding node 434 by running overlay network software on a router of the access point 424. As illustrated in FIG. 4E, the system divides the geographic region 411 into two new regions 412 and 413. Each region 412 and 413 may be associated with one or more overlay network nodes that are available for routing data from source devices in the particular region, and which are not available for routing data from source devices of other regions. In the example illustrated in FIG. 4E, source devices in the region 412 may designate in a data packet header the edge forwarding node 431 and the core forwarding node 433 as hops along a data transmission path. Source devices in the region 413 may not designate the edge forwarding node 431 and the core forwarding node 433 as hops along a data transmission path. Likewise, source devices in the region 413 may designate the edge forwarding node 432 and the core forwarding node 434 as hops along a data transmission path. Source devices in the region 412 may not designate the edge forwarding node 432 and the core forwarding node 434 as hops along a data transmission path. Similarly, when the system defines regions 412 and 413 as separate regions, the edge forwarding node 431 may not direct traffic to the core forwarding node 434, even if a physical transmission line exists between the data center 421 and the access point 424.

After a predetermined period of time, the system may cause the overlay network to revert to the network shown in FIG. 4A. For example, the system may predict the weight value of the core forwarding node 433 will exceed a threshold value for 12 hours. The system may set a time for increasing the data transmission capacity of the core forwarding node 433, as illustrated in FIG. 4C, to 24 hours. When 24 hours have elapsed, the system may remove the added router in the access point 423 from the overlay network.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer header. The outer header is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer header to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein for modifying an overlay network are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
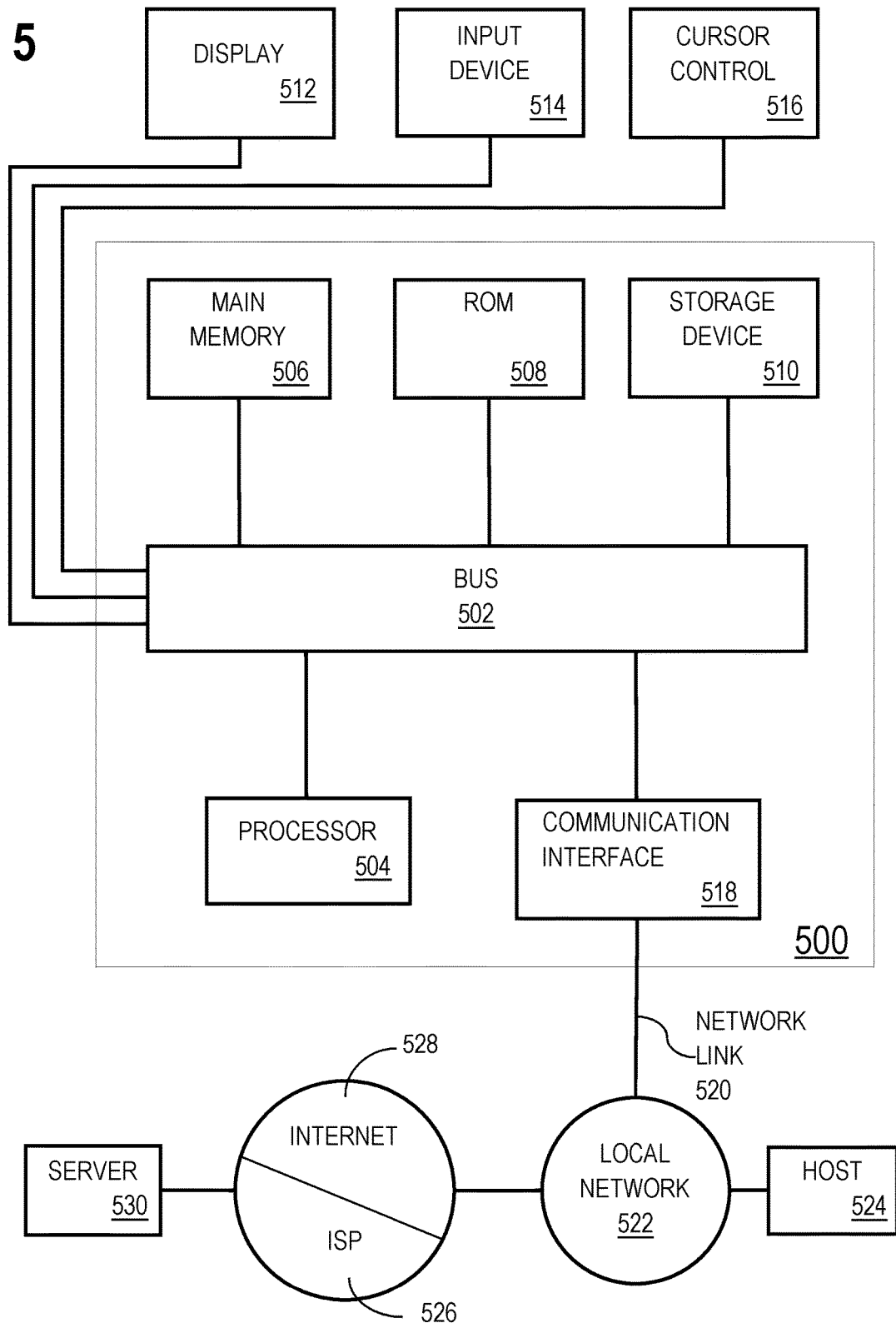
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic, or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:
   implementing a data transmission overlay network as software running on servers of a physical communications network,
      wherein the data transmission overlay network comprises a plurality of forwarding nodes that are configured to forward data between a source communicatively coupled to a first forwarding node of the plurality of forwarding nodes and a destination communicatively coupled to a second forwarding node of the plurality of forwarding nodes, wherein the plurality of forwarding nodes comprise a plurality of virtual machines executing on servers of the physical communication network;
   predicting network data transmission attributes for a geographical region corresponding to a portion of the physical communications network during a particular period of time; and
   based on predicted network data transmission attributes for the geographical region during the particular period of time:
      adding a particular forwarding node to the data transmission overlay network for forwarding data during the particular period of time at least by:
         converting a first server of the physical communication network into the particular forwarding node by instantiating a new virtual machine on the first server among the servers of the physical communication network.

2. The non-transitory computer readable medium of claim 1, wherein the operations further comprise, based on said adding the particular forwarding node to the data transmission overlay network, temporarily modifying routes used by the data transmission overlay network during the particular period of time to forward data through the particular forwarding node.

3. The non-transitory computer readable medium of claim 1, wherein the particular period of time is a defined duration of time, and
   wherein the particular forwarding node is temporarily added for the defined duration of time and terminated subsequent to the defined duration of time.

4. The non-transitory computer readable medium of claim 3, wherein the defined duration of time is defined based on one or more factors of a set of factors comprising:
   a block of time for which a network device provider leases access to the first server;
   a predicted period of time during over which a data traffic analysis engine predicts data traffic levels will exceed an upper threshold level;
   a granularity of a model predicting data traffic to edge forwarding nodes in the geographic region;
   a default duration of time assigned by an overlay network provider;
   a cost associated with leasing access to network devices at particular times and for particular durations of time; and
   a likelihood that a predicted or measured data traffic level for the geographic region is accurate.

5. The non-transitory computer readable medium of claim 1, wherein the predicted network data transmission attributes include predicted performance of existing forwarding nodes corresponding to the geographical region.

6. The non-transitory computer readable medium of claim 1, wherein the predicted network data transmission attributes comprise one or more of:
   geographic locations of users accessing the data transmission overlay network;
   per-user traffic of the users accessing the data transmission overlay network;
   a predetermined minimum number of forwarding nodes required to be maintained operational within the geographical region;
   a level of data transmission traffic through one or more forwarding nodes in the geographical region;
   a time associated with the level of data transmission traffic through the one or more forwarding nodes in the geographical region;
   data processing capacities of the one or more forwarding nodes;
   a reliability of the one or more forwarding nodes; and
   a historical level of data transmission traffic through the one or more forwarding nodes in the geographical region.

7. The non-transitory computer readable medium of claim 1, wherein each forwarding node of the plurality of forwarding nodes between the source and the second forwarding node performs operations comprising:

receiving a data packet;
decapsulating an outer header of the data packet;
identifying a route specified in the outer header;
determining whether to modify the route based on network characteristics;
re-encapsulating the data packet, without modifying an inner data packet; and
forwarding the data packet along a particular route toward the second forwarding node.

8. The non-transitory computer readable medium of claim 1, wherein adding the particular forwarding node to the data transmission overlay network for forwarding data during the particular period of time, comprises:
dividing the geographical region into a first geographical region and a second geographical region;
wherein a third forwarding node existing in the data transmission overlay network prior to adding the particular forwarding node is located in the first geographical region and forwards data traffic originating in the first geographical region; and
wherein the particular forwarding node is located in the second geographical region and forwards data traffic originating in the second geographical region.

9. The non-transitory computer readable medium of claim 1, wherein predicting the network data transmission attributes comprises generating a model representing predicted network data transmission attributes based at least on historical network data transmission attributes.

10. The non-transitory computer readable medium of claim 9, wherein the model includes a prediction of a number of data flows expected to transit one or more forwarding nodes in the geographical region.

11. The non-transitory computer readable medium of claim 1, wherein predicting the network data transmission attributes comprises:
training a machine learning model to predict the network data transmission attributes; and
applying a set of current network data transmission attributes to the machine learning model to generate a set of predicted network data transmission attributes,
wherein training the machine learning model comprises:
obtaining training data sets of historical network attribute data, each training data set comprising:
a first set of first network data transmission attributes associated with a first time period, the first network data transmission attributes including, at least, data traffic through the data transmission overlay network in a historical geographical region;
a second set of second network data transmission attributes associated with a second time period subsequent to the first time period;
training the machine learning model based on the training data sets;
receiving a set of current network data transmission attributes; and
applying the machine learning model to the set of current network data transmission attributes to generate a set of predicted network data transmission attributes.

12. The non-transitory computer readable medium of claim 1, wherein a first virtual machine is running on the first server,
wherein the network data transmission attributes are predicted for the geographical region associated with the first servers, and
wherein instantiating the new virtual machine on the first server includes instantiating a second virtual machine to run concurrently with the first virtual machine on the first server.

13. The non-transitory computer readable medium of claim 1, wherein the new virtual machine transmits data over the Internet via the first server.

14. A method comprising:
implementing a data transmission overlay network as software running on servers of a physical communications network,
wherein the data transmission overlay network comprises a plurality of forwarding nodes that are configured to forward data between a source communicatively coupled to a first forwarding node of the plurality of forwarding nodes and a destination communicatively coupled to a second forwarding node of the plurality of forwarding nodes, wherein the plurality of forwarding nodes comprise a plurality of virtual machines executing on the servers of the physical communication network;
predicting network data transmission attributes for a geographical region corresponding to a portion of the physical communications network during a particular period of time; and
based on predicted network data transmission attributes for the geographical region during the particular period of time:
adding a particular forwarding node to the data transmission overlay network for forwarding data during the particular period of time at least by:
converting a first server of the physical communication network into the particular forwarding node by instantiating a new virtual machine on the first server among the servers of the physical communication network.

15. The method of claim 14, further comprising, based on said adding the particular forwarding node to the data transmission overlay network, temporarily modifying routes used by the data transmission overlay network during the particular period of time to forward data through the particular forwarding node.

16. The method of claim 14, wherein the particular forwarding node is temporarily added for the particular period of time and terminated subsequent to the particular period of time.

17. The method of claim 14, wherein the predicted network data transmission attributes include predicted performance of existing forwarding nodes corresponding to the geographical region.

18. The method of claim 14, wherein the predicted network data transmission attributes comprise one or more of:
geographic locations of users accessing the data transmission overlay network;
per-user traffic of the users accessing the data transmission overlay network;
a predetermined minimum number of forwarding nodes required to be maintained operational within the geographical region;
a level of data transmission traffic through one or more forwarding nodes in the geographical region;
a time associated with the level of data transmission traffic through the one or more forwarding nodes in the geographical region;
data processing capacities of the one or more forwarding nodes;

a reliability of the one or more forwarding nodes; and
a historical level of data transmission traffic through the one or more forwarding nodes in the geographical region.

19. The method of claim 14, wherein each forwarding node of the plurality of forwarding nodes between the source and the second forwarding node performs operations comprising:
   receiving a data packet;
   decapsulating an outer header of the data packet;
   identifying a route specified in the outer header;
   determining whether to modify the route based on network characteristics;
   re-encapsulating the data packet, without modifying an inner data packet; and
   forwarding the data packet along a particular route toward the second forwarding node.

20. The method of claim 14, wherein adding the particular forwarding node to the data transmission overlay network for forwarding data during the particular period of time, comprises:
   dividing the geographical region into a first geographical region and a second geographical region;
   wherein a third forwarding node existing in the data transmission overlay network prior to adding the particular forwarding node is located in the first geographical region and forwards data traffic originating in the first geographical region; and
   wherein the particular forwarding node is located in the second geographical region and forwards data traffic originating in the second geographical region.

21. The method of claim 14, wherein predicting the network data transmission attributes comprises generating a model representing predicted network data transmission attributes based at least on historical network data transmission attributes.

22. The method of claim 21, wherein the model includes a prediction of a number of data flows expected to transit one or more forwarding nodes in the geographical region.

23. The method of claim 14, wherein predicting the network data transmission attributes comprises:
   training a machine learning model to predict the network data transmission attributes; and
   applying a set of current network data transmission attributes to the machine learning model to generate a set of predicted network data transmission attributes,
   wherein training the machine learning model comprises:
   obtaining training data sets of historical network attribute data, each training data set comprising:
      a first set of first network data transmission attributes associated with a first time period, the first network data transmission attributes including, at least, data traffic through the data transmission overlay network in a historical geographical region;
      a second set of second network data transmission attributes associated with a second time period subsequent to the first time period;
   training the machine learning model based on the training data sets;
   receiving a set of current network data transmission attributes; and
   applying the machine learning model to the set of current network data transmission attributes to generate a set of predicted network data transmission attributes.

24. A system comprising:
   one or more processors; and
   memory storing instructions that, when executed by the one or more processors, cause the system to perform:
   implementing a data transmission overlay network as software running on servers of a physical communications network,
      wherein the data transmission overlay network comprises a plurality of forwarding nodes that are configured to forward data between a source communicatively coupled to a first forwarding node of the plurality of forwarding nodes and a destination communicatively coupled to a second forwarding node of the plurality of forwarding nodes, wherein the plurality of forwarding nodes comprise a plurality of virtual machines executing on the servers of the physical communication network;
   predicting network data transmission attributes for a geographical region corresponding to a portion of the physical communications network during a particular period of time; and
   based on predicted network data transmission attributes for the geographical region during the particular period of time:
      adding a particular forwarding node to the data transmission overlay network for forwarding data during the particular period of time at least by:
         converting a first server of the physical communication network into the particular forwarding node by instantiating a new virtual machine on the first server among the servers of the physical communication network.

* * * * *